(12) United States Patent
Wójcicki et al.

(10) Patent No.: US 12,380,370 B1
(45) Date of Patent: Aug. 5, 2025

(54) HARDWARE-AWARE AUTOMATED MACHINE LEARNING (AutoML) MODEL CREATION AND OPTIMIZATION

(71) Applicant: Eta Compute, Inc., Sunnyvale, CA (US)

(72) Inventors: Jeremi Wójcicki, Milan (IT); Evan Petridis, Palo Alto, CA (US); Justin Ormont, Seattle, WA (US); Adisa Bolić, Sarajevo (BA)

(73) Assignee: Eta Compute, Inc., Sunnyvale, CA (US)

( * ) Notice: Subject to any disclaimer, the term of this patent is extended or adjusted under 35 U.S.C. 154(b) by 0 days.

(21) Appl. No.: 19/005,923

(22) Filed: Dec. 30, 2024

Related U.S. Application Data

(60) Provisional application No. 63/619,192, filed on Jan. 9, 2024.

(51) Int. Cl.
*G06N 20/00* (2019.01)

(52) U.S. Cl.
CPC .................... *G06N 20/00* (2019.01)

(58) Field of Classification Search
CPC ........ G06N 3/063; G06N 3/044; G06N 3/045; G06N 3/08; G06N 20/00; G06N 7/01; G06N 3/04
See application file for complete search history.

(56) References Cited

U.S. PATENT DOCUMENTS

2022/0019880 A1 * 1/2022 Dasgupta ............... G06N 3/04
2022/0035877 A1 * 2/2022 Nittur Sridhar ....... G06N 3/086

\* cited by examiner

*Primary Examiner* — Abdullah Al Kawsar
*Assistant Examiner* — Tewodros E Mengistu
(74) *Attorney, Agent, or Firm* — SoCal IP Law Group LLP; Angelo J. Gaz; Steven C. Sereboff

(57) ABSTRACT

Automated machine learning (Auto ML) for creating and optimizing ML models using a model store for storing: trained ML models and hardware models; test metrics data corresponding to the stored models; ML advised-models. Using a model meta-services (MMS) for: accessing the stored models and the test metrics data; creating the ML meta-models based on the runtime test metrics data; and answering MPC queries. Using a models producer and consumer (MPC) for: selecting a ML advised-model; testing the selected ML advised-model using selected ML test inputs and outputs to provide runtime test metrics data; optimizing the selected ML advised-model using the runtime test metrics data; sending the optimized ML advised-model to the model store unit for storing as one of the stored ML advised-models; and sending the runtime test metrics data to the model store unit for storing as part of the runtime test metrics data; and sending the MPC queries.

20 Claims, 12 Drawing Sheets

- Includes transfer learning: reusing model weights from past runs on similar datasets. Reduces training time and improves generalization

*FIG. 7E*

- Runs inference of a model on a real chip to get exact runtime, memory usage and energy consumption.

*FIG. 7F*

- Removes duplicates
- Periodically cleans database (under performing models)

*FIG. 7G*

- Scalable cloud infrastructure
- Provides compute power, memory and storage for machine learning workloads
- Allows task and data parallelism
  - Multiple jobs in parallel
  - Single job distributed across many physical machines

*FIG. 7H*

© 2024 Eta Compute, Inc.

HARDWARE-AWARE AUTOMATED MACHINE LEARNING (AutoML) MODEL CREATION AND OPTIMIZATION

RELATED APPLICATION INFORMATION

This patent claims priority from U.S. Provisional Patent Application No. 63/619,192, titled, ML MODEL OPTIMIZATION, filed Jan. 9, 2024.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

Automated machine learning (AutoML) systems and processes for hardware-aware automated machine learning (ML) model creation and optimizing are described.

Description of the Related Art

Artificial Intelligence (AI) offers huge benefits for embedded systems. But implementing AI well requires making smart technology choices, especially when it comes to creating, training and/or selecting a trained machine learning (ML) model and an actual hardware processor chip to run the model on.

How do you correctly select the best model and chip combination so that you end up with an optimized trained ML hardware model? The answer lies in ML hardware models being developed that will power AI in the future. Similar to an engine in an automobile, the ML hardware model determines how well, how fast and how efficient the vehicle will run.

AI, machine learning (ML) and deep learning are all terms that can be used for neural networks which are designed to classify objects into categories after a training phase. ML hardware models require powerful chips for computing answers, which is called inferencing, from large data sets, which is the training part. Inference is the part of machine learning when the neural net uses what it has learned during the training phase to deliver answers to new problems. This is particularly important in edge applications, which may be defined as anything outside of the data center. A neural network may be one specific type of a ML model.

The edge ML hardware model market is expected to be one of the biggest over the next five years. Typical applications may include smart surveillance cameras and real-time object recognition, autonomous driving cars and other Internet of things (IoT) devices. In the past, most ML hardware models were developed for the data center. However, the movement of AI to the edge of the network requires a new generation of specialized ML hardware model processors that are scalable, cost effective and consume extremely low power.

There are two key issues in machine learning (ML) today that existing processes and systems do not handle well:
1. The space of ML models (neural network (NN) architectures×hyperparameters) is very high dimensional. People curate this space using a combination of heuristics (read latest papers, see what is on top of the charts at Hugging Face, do some experiments etc.). This is a very inefficient way to explore the space of possible ML models. Most of the model space remains unexplored; the industry-adopted model architectures are just the best of a very sparse sampling of the space of ML models.
2. Determining how well a specific model architecture works on a particular ML task entails training the model then testing the model. Training is a very compute-intensive task: this translates into:
   a. Very high energy use for training;
   b. Large cost outlays; and/or
   c. Long training time.

Inference chips are equipped with hardware accelerators of different architectures (types and sizes of vector units, presence of cache, instruction sets, on-chip vs off-chip memory, array/systolic computation architectures, digital vs analog computation etc.). Also, runtime engines which compile and schedule execution of neural network operators differ significantly in their implementation from chip vendor to chip vendor. In consequence the relative performance of NN operators' execution, and even the supported operator set, vary greatly from chip to chip. Understanding if a given model is runnable within user defined constraints (memory limits, execution time, supported model operators/architecture, accuracy) is not a trivial matter. Therefore, characterizing a NN model's performance (along axes like accuracy, execution time, energy consumed) typically requires running it on the specific hardware for which inference is targeted.

What is needed is automated machine learning (AutoML) systems and processes for hardware-aware machine learning (ML) model creation and optimizing that work quickly, cheaply and accurately.

DESCRIPTION OF THE DRAWINGS

FIGS. 7A-J are, altogether, a block diagram of system design Auto ML systems and processes for hardware-aware ML model creating and optimizing.

Figure 1:
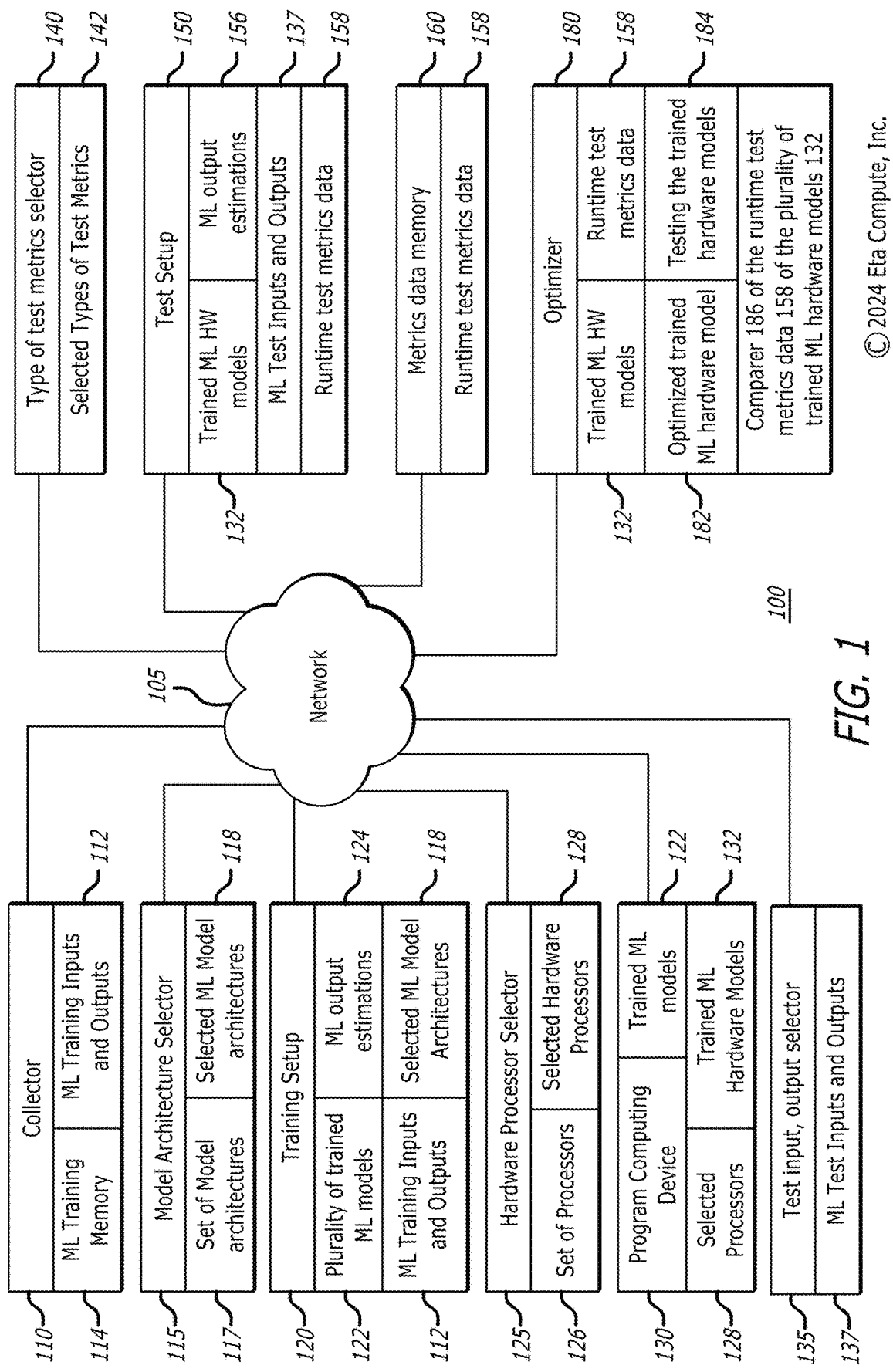
FIG. 1 is a block diagram of a system for optimizing a trained machine learning (ML) hardware model to become an optimized trained ML hardware model.

Throughout this description, elements appearing in figures are assigned three-digit or four-digit reference designators, where the two least significant digits are specific to the element and the one or two most significant digit is the figure number where the element is first introduced. An element that is not described in conjunction with a figure may be presumed to have the same characteristics and function as a previously-described element having the same reference designator or the same two least significant digits.

DETAILED DESCRIPTION

Determining how well a specific machine learning (ML) model architecture works on a particular ML task typically entails training the model then testing the model. The training and testing, often repeated to determine an optimized trained model, is a very compute-intensive task. Previously, AutoML systems have been proposed to try to address these problems, but there are a number of issues common to all of those proposed solutions, such as:

1. Exploding dimensions in architecture AutoML search (as many as several hundred for architecture and train hyperparameters). This leads to a large number of iterations required to obtain a well-optimized trained model (i.e. high accuracy at low execution time) and poor per-chip-specialization.
2. Architecture search is strongly coupled with model training: every model is trained from scratch to evaluate each architecture. Therefore it is very resource-intensive (today's methods often require more than 100 GPU days on a single AutoML run to obtain good results). Within a fixed computational budget, the user has to choose between the number of models trained and the training effort dedicated to a single model (e.g., number of epochs). This results in a choice of two poor outcomes: (i) many models, none of them reaching high accuracy because of short training OR (ii) few models trained for long enough, but not reaching high accuracy due to suboptimal architecture and training parameters (too few trials to determine optimal model configuration). That's why fixing an architecture (such as MobileNet) often leads to noticeably better performance than using a generic architecture search; the search is arbitrarily narrowed to the specific NN architecture, allowing a deep search within that architectural space.

In general, this regime wastes a lot of energy, due to the large number of models that need to be trained, while only one (or a small number) of models is ultimately used.

3. Lack of knowledge sharing between different AutoML runs, which may be or include AutoML work tasks, AutoML user task and/or AutoML jobs. Each run starts with no a priori knowledge of which solutions worked best in the past on related problems, or even this same problem.
4. No transfer learning is possible unless using off-the-shelf architectures. In a generic search, each architecture is almost certainly unique, thus there is no way to load pre-trained weights into the models in the trials that follow. While training a high-performing model usually requires several hundred epochs, with transfer learning (and/or fine-tuning) similar accuracy may be obtained in a matter of 5-10 epochs.
5. The need to test every model on hardware takes a significant amount of human effort and elapsed time. This slows down the AutoML optimization loop and presents a limiting factor for servicing a large number of AutoML runs/users simultaneously when testing in hardware can take up more time than training models themselves.

Technologies described herein provide systems and methods for optimizing a trained machine learning (ML) hardware model to become an optimized trained ML hardware model. The systems and methods may simultaneously and automatically calculate and compare real runtime performance metrics for estimations made by multiple trained automatic machine learning (AutoML) models run on multiple actual processor hardware chips. Real runtime performance metrics that can be selected for testing the trained ML hardware model include power, performance, accuracy, optimization objectives, model and performance constraints.

Technologies described herein also include AutoML systems and processes for hardware-aware ML model creation and optimizing. The AutoML systems may include multi-tenant, large scale AutoML system architectures and usage of such systems for hardware-aware ML model creation. Descriptions herein of being "for" an action may mean that units, components or systems are configured to and/or adapted to perform that action, such as 1) as part of optimizing trained ML hardware models to become an optimized trained ML hardware model; and/or 2) as part of an AutoML systems and processes for hardware-aware ML model creation and optimizing.

Referring now to FIG. 1, there is shown a block diagram of a system 100 for optimizing plurality of trained ML hardware models 122 to become an optimized trained ML hardware model 182 using runtime test metrics data 158 from testing of the trained ML hardware models 184/122 of selected hardware processors 128. The system 100 includes collector 110, selector 115, setup 120, selector 125, device 130, selector 135, selector 140, setup 150, memory 160 and optimizer 180, each of which may be described as or as including at least one unit, module, engine or computing device. These units of system 100 are all interconnected by a network 105, such as a data connection like the Internet. These units of system 100 may each be located on at least one separate computing device. Any combination or combinations of the units may be on the same computing device. In some cases, all of the units are on one computing device. A computing device may be or include a client, a server, or another type of computing device. A unit may include a memory and a processor executing computer instructions stored in the memory to perform the actions of the unit. A unit may be assisted by a human user using an input/output device such as a keyboard and a display.

The actions of each of the units of system 100 may be performed automatically and/or manually (i.e., under human control, but not as a mental process). Automatically or automated may describe when a system (or unit) in which an action occurs without user input to cause, guide or select that actions course, end, selection, optimization or comparison. Occurring manually may describe when a system (or unit) in which an action occurs with or only by user input to cause, guide or select that action's beginning, course, end, selection, optimization or comparison. Occurring manually, may be when an action is assisted by or performed only by a human user, such as of system 100.

Collector 110 is a collector for collecting ML training inputs and ML training outputs for training a ML model. The training inputs may be (analog or digital) images, pictures, frames, video, audio, data, text, sensor data (e.g. Electrical signals or 3D data from radars, etc.) or other media. Collecting may or may not include actually creating the ML inputs and outputs. Collector 110 may be or include one or more computing devices, software executing on processors, neural networks, training beds, training systems, training architectures and/or training simulators.

The collector 110 may automatically or manually create the ML training inputs and ML training outputs 112 using a simulator, such as a camera and ML model and processor (e.g., IC chip) used with a display of known inputs having known outputs. The collector 110 may obtain the ML training inputs and outputs 112 (manually or automatically) from system 100 or another source of data. The collector may obtain the ML training inputs and ML training outputs 112 from another party such as a customer who purchases the optimized trained ML model 182 or desires the custom model at 295. The customer may provide the inputs and outputs 112 to the user and hire the user to produce the model 182 for a fee.

The collector 110 may include an ML training input-to-output selector (not shown) for automatically creating metadata for the ML training inputs and the ML training outputs 112, and automatically creating labels for the ML training inputs and the ML training outputs 112. In other cases, the metadata and/or labels are manually created. The collector 110 may include an ML training memory 114 for storing the ML training inputs, the ML training outputs, the metadata and the labels in a ML model database.

Selector 115 is an ML model architecture selector for accessing and selecting a plurality (e.g., greater than 1 but less than 100,000) of selected ML model architectures 118 derived from a set of ML model architectures 117. The set of ML model architectures 117 may be one or more types of ML model architectures. Selector 115 may be or include one or more computing devices and/or software executing on processors.

Setup 120 is a training setup for training a plurality of trained ML models 122 by training the selected ML model architectures 118 with the ML training inputs and the ML training outputs 112 to make ML output estimations 124 based on ML inputs. Setup 120 may be or include one or more computing devices, software executing on processors, neural networks, training beds, training systems, training architectures and/or simulators such as described for collector 110.

Selector 125 is a hardware processor selector for selecting a plurality of selected hardware processors 128 from a set of hardware processors 126. Each processor may be part of and optionally described as a PCB, hardware board or chip which includes the processor. Selector 125 may be or include one or more computing devices and/or software executing on processors.

A hardware processor of processors 126 and 128 may be or include a computer processor, an integrated circuit (IC) chip, BIOS, electronic circuitry or other fabricated semiconductor hardware capable of being programed with, retaining and executing one or more of the trained ML models 122. It may be an IC, also called microelectronic circuit, microchip, or chip, having an assembly of electronic components, fabricated as a single unit, in which miniaturized active devices (e.g., transistors and diodes) and passive devices (e.g., capacitors and resistors) and their interconnections are built up on a thin substrate of semiconductor material (typically silicon).

In some cases, each of processors 126 and 128 includes electronic circuitry, such as including PCB, transistors, resistors, capacitors, inductors, traces, ICs, chips, ROM and/or other hardware circuitry that is programed with, retaining and executing one or more of the trained ML models 122. In some cases, each is computer logic, computer chips, a computer chip, computer circuitry and/or computer hardware. In some cases, each is a computer processor or hardware logic programmed with software.

Device 130 is a programmed computing device for programming the plurality of selected hardware processors 128 to create a plurality of trained ML hardware models 132 by inputting the plurality of selected hardware processors 128 with the plurality of trained ML models 122. The plurality of models 132 may be a matrix or an array of the plurality of processors 128=P multiplied by the plurality of models 122=M to form a P×M matrix. Device 130 may make each of the model 132 as or on the particular chip 128. Device 130 may be or include one or more hardware programming computing devices, software executing on processors, programming beds, programming architectures and/or simulators such as described for collector 110. In some cases, there is only one of processors 128 such as where the same processor will be programmed with a number of models 122 to create models 132 which are optimized. In other cases, there are multiple processors 128. It is possible that optimizing starts with one processor 128 and after testing, another processor 128 is selected.

Selector 135 is a ML test input and output selector for selecting ML test inputs and ML test outputs 137 for testing the plurality of trained ML hardware models 132. Selector 135 may be or include one or more computing devices and/or software executing on processors.

Selector 140 is a type of test metrics selector for selecting types of test metrics 142 for testing the trained ML hardware model. The types of test metrics 142 may include measurement, power, performance, accuracy, etc. metrics; optimization objectives; model constraints; and/or performance constraints measured when testing the trained ML hardware models 132.

The types of test metrics 142 may include Multi-objective optimization of any two or more of the types of test metrics 142. The types of test metrics 142 may include Multi-objective optimization of power, speed, accuracy, memory usage and/or numerical exactness of the trained ML hardware models 132 (e.g., using data 182). Selector 140 may be or include one or more computing devices and/or software executing on processors.

Setup 150 is a testing setup for testing the plurality of trained ML hardware models 132 using the ML test inputs and ML test outputs 137 to produce or provide runtime test metrics data 158 for the selected types of test metrics 142. Data 158 may be measured for, from or on the models 132 when they are input with the test inputs 137 and have their output estimations 156 compared to the test outputs 137 during their testing. Data 158 may predict speed and accuracy of the models 132, such as per an estimation of ML outputs 156 made by the trained ML hardware models 132 given the ML test inputs.

Setup 150 may include hardware connections such as wired or wireless data connections between a computing device and the models 132. Setup 150 may test the models 132 by hooking each model to a test rig, which is the physical testing of how well does the model work. The test rig could be or include a simulator, a camera, and/or a computer monitor that displays images or video, such as of people walking in and out of view. This allows easy comparisons of models 132 by the optimizer.

Using the test rig is a more holistic test because it includes the full device, e.g., model 132 with the camera, not just the model 132. Thus, the accuracy, speed and power of a model 132, including the camera and the communication subsystem (e.g., the Bluetooth stack or the Wi-Fi stack) can be measured during the testing. This gives full and accurate testing of power consumption and length of the battery life. Setup 150 may be or include one or more computing devices, software executing on processors, neural networks, test beds, test systems, test architectures and/or simulators such as described for collector 110.

Memory 160 is a metrics data memory or for collecting and/or storing the runtime test metrics data 158 from the testing at setup 150. Memory 160 may be or include one or more computing devices and/or software executing on processors.

Optimizer 180 is an optimizer for optimizing the plurality of trained ML hardware models 132 to become an optimized trained ML hardware model 182 using the runtime test metrics data 158 by simultaneously and automatically performing the testing of the trained ML hardware models 184 at setup 150 and by comparer 186 performing comparing of the runtime test metrics data 158 of the plurality of trained ML hardware models 132 during testing 184 at setup 150.

Comparer 186 comparing may include comparing against each other the data 158 of each of models 132 to select one or more of data 158 for one or more of models 132 that is better or more desirable than the other of data 158 of models 132. Comparing at 186 may include selecting one of data 158 for one of models 132 that is better or more desirable than the other of data 158 of models 132.

Optimizer 180 and/or the comparing at 186 may include a human user using one or more input devices, output devices and/or displays of a computing device to optimize the plurality of trained ML hardware models 132 to select an optimized trained ML hardware model 182 using the runtime test metrics data 158 by simultaneously and automatically performing the testing at setup 150 and performing comparing at 186 of the runtime test metrics data 158 of the plurality of trained ML hardware models 132. In some cases, the human user may be assisted by a computer ML of optimizer 180 and/or comparer 186. Optimizer 180 may include a computing device display for simultaneously and automatically displaying the runtime test metrics data 158 of the plurality of trained ML hardware models 132.

Optimizer 180 may include one or more of: a new model selector for selecting a new selected ML model architecture of architectures 117 that is part of the optimized trained ML hardware model 182 to be the optimized trained ML hardware model 182; a new processor selector for selecting a new selected hardware processor of processors 126 that is part of the optimized trained ML hardware model to be the optimized trained ML hardware model 182; and/or a model updater for updating the trained ML hardware model 132 (or models 122) using the runtime metrics test data 158 to be the optimized trained ML hardware model 182.

Optimizer 180 may include a re-tester and re-optimizer for re-testing and re-optimizing the optimized trained ML hardware model 182 to select a new optimized trained ML hardware model. Here, the optimized trained ML hardware model 182 may be a plurality of optimized trained ML hardware models. In this case, the testing setup 150 may produce (or provide) new runtime test metrics data 158 for the selected types of metrics 142 for or based on the ML output estimations 156 made by the plurality of optimized trained ML hardware models 182 using or given the ML test inputs and outputs 137. Here, the optimizer 180 may optimize the plurality of optimized trained ML hardware models 182 using the new runtime test metrics data 158 by simultaneously and automatically performing the testing of the plurality of optimized trained ML hardware models 182 and by comparer 186 performing comparing of the new runtime test metrics data of the plurality of optimized trained ML hardware models 182.

The optimized trained ML hardware model 182 may be a computer product such as a software (e.g., non-transitory computer instructions in a memory that can be executed by a processor) and/or hardware (e.g., a chip or IC) product. This computer product may be sold to a customer or user, such as for the purpose of allowing the customer to provide the AI capabilities of the optimized trained ML hardware model 182. The software, hardware or chip is or includes the optimized trained ML hardware model 182. The software, hardware or chip improves computer capability because it has the optimized trained ML hardware model 182 which is not a generic computer product. The software, hardware or model 182 may be a unique computer product in that only that customer may own or have legal rights to it.

Optimizer 180 may be or include one or more computing devices, software executing on processors, neural networks, test data analyzers, metrics data analyzers, test analysis architectures and/or metrics data comparers.

System 100 may also include a validator for creating a validated version of the optimized trained ML hardware model 182 by writing firmware to one of the selected hardware processors 128. The validator may be or include one or more computing devices, software executing on processors, neural networks, test data analyzers, metrics data analyzers, test analysis architectures and/or metrics data comparers.

Network 105 is a computer network or data connection such as including (analog and/or digital) wired, wireless, cell and other data communications. The interconnections between units of system 100 may be or include wired, wireless, message, packet, Internet, Intranet, LAN and other known data connections between computing device or other electronic devices.

Figure 2A:
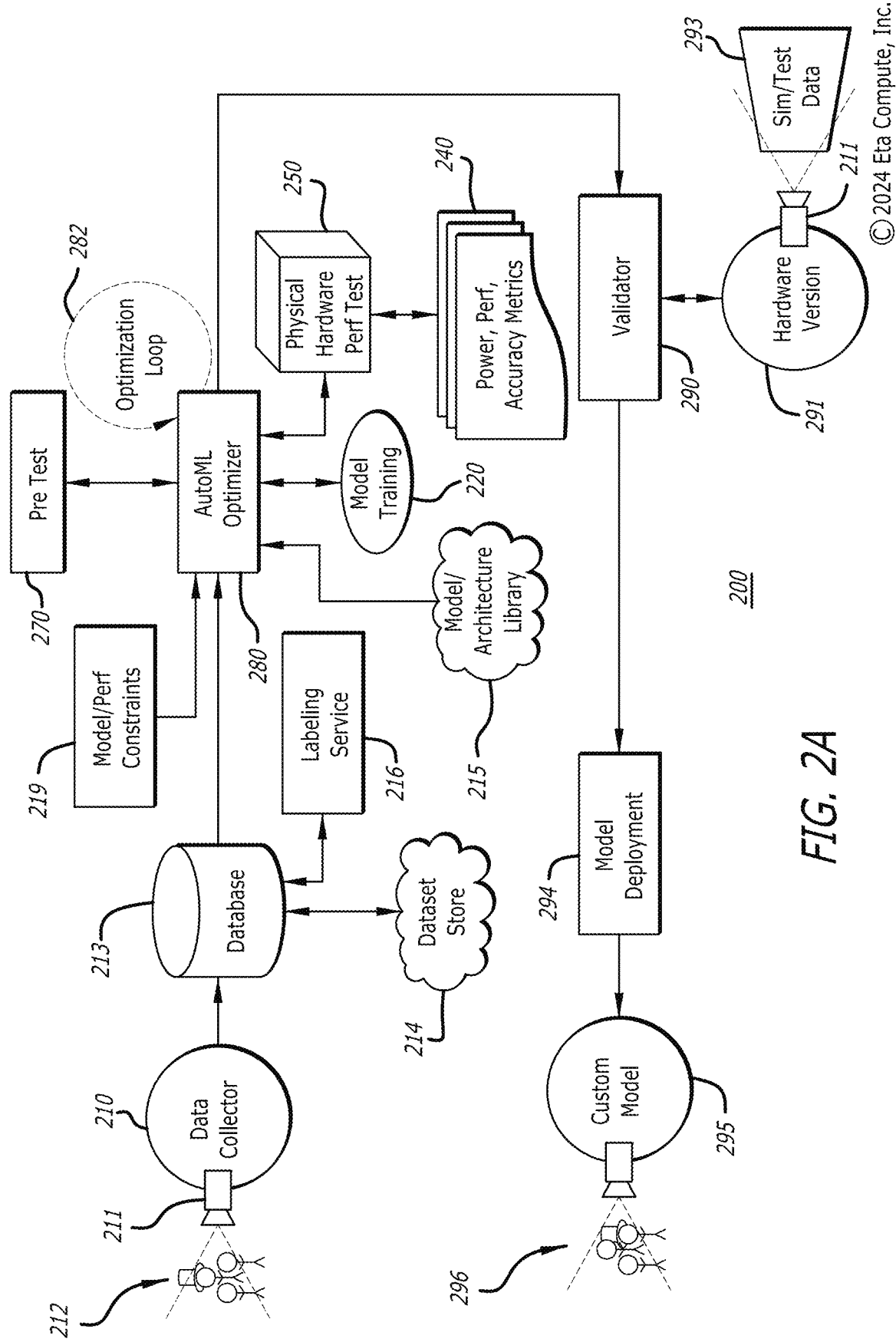
FIG. 2A is a block diagram of a system for optimizing a trained ML hardware model to become an optimized trained ML hardware model.

FIG. 2A is a block diagram of a system 200 for creating and optimizing a trained ML hardware model 132 to become an optimized trained ML hardware model 182. System 200 may create models 182 from scratch, not just optimizing existing models 132. Each of the parts of system 200 may be described as or as including at least one unit, module, engine or computing device. These units of system 200 are all interconnected data connections such as by network 105. These units of system 200 may each be located on separate or the same computing device as noted for system 100. System 200 may include one or more units of system 100. System 100 and/or 200 may be a suite of different machines hosted in a cloud computing platform except for some physical nodes that are at other servers and/or clients distributed at different locations. For example, test 250 may test models 122 on physical boards or processors 128 at one or more different locations. A goal of the system 100 and/or 200 may be to create a model 182 that can distinguish dog breeds in images. The actions of each of the units of system 200 may be performed automatically and/or manually.

The data collector 210 of system 200 may be collector 110 that automatically or manually creates the ML training inputs and ML training outputs 112 using a simulator, such as a camera 211 imaging a scene 212 of still or video frames. The data collector 210 may scrape ML training inputs and/or outputs 112 off of a server, the Internet or another network. Inputs and outputs 112 may be or use known image inputs having known outputs. Inputs and outputs 112 may be collected by a customer that is a third party to the system, by a user of the system or automatically by the system. The inputs may be images having dogs or fruit and the outputs may label whether the image has a dog or fruit. In some cases, data 112 is only the inputs and the outputs are created later by a labeling service 216. Although images are discussed as actual inputs, any kind of digital data can be an input, such as audio recordings, time series data and multi-modal data.

From collector 210, the ML training inputs and ML training outputs 112 are sent to and received by the database 213. The database may be or be accessed by an SQL server, an SQL database and/or an Amazon simple storage service (S3). Database 213 may be accessible by users accessing cluster controllers that pick up work tasks from SQL database 213 and send them to a cluster. Sending may spin up machines in a cloud service such as Microsoft Azure to form a cluster of nodes for the training process at setup 120. Database 213 includes and stores datasets which include inputs and outputs 112.

Database 213 sends datasets to and receives datasets from dataset store 214 which stores the datasets. Store 214 may be part of or use S3 to store computer data files. The datasets may include metadata about the data set, such as describing where the dataset is stored, a file location for the dataset, and what the dataset is and/or is for. The datasets may include labeling, such as for the inputs and/or outputs 112.

From database 213 the datasets are sent to and received by the labeling service 216 which may label (or annotate) the training inputs and/or outputs 112 manually and/or automatically. A label may describe an output of what's in an input datum such as image: an apple, a banana, a cat and/or a dog. Service 216 has a label data set, such as describing each training ML input as having an ML output. The labels from service 216 are stored in store 214. Input datum can include, but is not limited to: an indication of an anomalous state of a machine in a sensor signal (such as electrical, vibration); the best fitting word to autocomplete a sentence or a classification of a text to determine the sentiment of the author. Input datum may not include an explicit label and in this case is used for unsupervised learning algorithms, such as variational autoencoders.

In the case of object detection, service 216 may draw a square box around every single detected desired object (e.g., a person) in the input images. Service 216 can also perform labeling in the case where inputs and outputs 112 are audio data such as from a video camera, microphone, other audio media generator or audio storage. Service 216 can also label for inputs and outputs 112 that are vibrational analysis, gas detection or wire/conduction detection.

Service 216 can also label an analysis that was run on the inputs 112, such as what percent of the input images are grayscale versus color; or how large is every image; and/or what percent of the images have people and how many people on average are and the images. Database 213 sends the datasets including the labels and training inputs and/or outputs 112 to automatic (auto) ML tester and optimizer 280. In some cases, the analysis can reveal incorrect labels which can be automatically corrected by service 216 or by a user controlling service 216.

Model and performance constraints 219 provides performance constraints of the models such as model 118, 122 and/or 132. The constraints at 219 may be a user's or customer's performance constraints such as how fast and accurate to run the testing or estimations. Constraints at 219 may be different clock rates for a specific processor 128 or what processors 128 to program with models 122. Constraints at 219 may be to run a model on selected hardware boards having processor 128 at a certain estimation speed. The boards may have a Synaptics™ chip, an NXP™ chip, an ST™ chip or another brand of microprocessor. Constraints at 219 may include what dataset from database 213 to use with the constraints, model 118, 122 and/or 132.

Constraints 219 may include type of light, such as whether to use either color or monochrome, as input. If monochrome is chosen, test 250 can spend more of the time testing different layers of models 132 besides the input layer, because input layer tends to be kind of big and slow. And if the color, saturation or hue do not actually help optimize at loop 282 then monochrome is a better solution because you can use that difference in time to optimize for other purposes as the color was extraneous. Constraints 219 sends the constraints to automatic ML tester and optimizer 280.

Model/architecture library 215 includes a set of types or styles of neural network architectures 117 from which to choose architectures 118. One model architecture may have a structure akin to a straight through model. There are other architectures, such as pre-designed types of architectures, may have a tree-like structure. Library 215 can also modify the types of model architectures by adding and removing components; growing and shrinking components; and duplicating layers of the model architectures to select architectures 118. Library 215 may use neural architecture search (NAS) to select architectures 118. Library 215 sends architectures 118 to automatic ML tester and optimizer 280.

Model training 220 uses the dataset from data store 214 with labeling from service 216 to train selected architecture 118 from library 215 using constraints 219. Training 200 may be training the selected architectures 118 that a user wants trained. Training 220 may send the architectures 118 to a specific machine or set of machines to train, that train the architectures and create trained models 122 from them, such as by building a neural network. Training 220 may train the models 122 to predict a difference between images, such as those having dogs or fruit.

Model training 220 may send the dataset from dataset store 214 and constraints 219 to a cluster to train selected architecture 118, create trained model 122 and evaluate what the accuracy of model 122 is, such as where accuracy is the English version of accuracy, not the machine learning version of accuracy.

One of architectures 117 or 118 may be like the skeleton of an ML model without the weights filled in and which can be trained to make a model 122. One can be a generic architecture, like mobile Net, V2 and the like that is trained with a specific dataset from database 213 and specific hyper parameters 219 to make a specific trained model 122. For example, training images can train architectures 118 with the desired input and output results to get models 122 which are used to try and figure out which silicon processors 128 they work best on. Model training 220 may send dataset, label, architecture, constraints and other data to and receive that data from automatic ML tester and optimizer 280.

Power, performance and accuracy metrics 240 is a set of types of performance test metrics from which selected metrics 142 may be selected and for which runtime test metrics data 158 may be produced. Metrics 240 may be a number of possible machine learning metrics such as how much power does a model 132 take to perform one or a number of estimations 156. How fast does that model 132 run? Does that model 132 run accurately on the physical board having processor 128? Does that model 132 run correctly on the physical board? Metrics 240 may send selected metrics 142 and metrics data 158 to and receive that data from physical hardware performance test 250.

The physical hardware performance test 250 tests the models 132 from training 220 by programming processors 128 with models 122, and then using the ML test inputs and ML test outputs 137 to test models 132 and produce runtime test metrics data 158 for the selected types of test metrics at 240. Test 250 may include descriptions for setup 150. Test 250 may use a testing rig to test models 132 with the test inputs and outputs to produce data 158. Test 250 may test whether models 132 successfully predict a difference between images having dogs or fruit.

The test rig may have known outputs 137 and run the same inputs (e.g., videos) as known inputs 137 past each model 132 being tested. For example, the models 132 either count a person that walked through in the video or do not. Setup 150 knows what kind of person walked through in the video and data 158 shows the model 132 made the right decision at estimation 156. The video might show three people wearing light clothing walking onto a bus. Data 158 shows whether the people in light clothing counted or not. Physical hardware performance test 250 may send selected metrics 142, models 132 and metrics data 158 to and receive models 122, ML test inputs and ML test outputs 137 and constraints 219 from ML tester and optimizer 280.

Processor pre-test 270 is for exploring the capabilities of processor 128 and storing those capabilities so they can be accessed later by optimizer 280 and loop 282 when optimizing models 132 to become model 182. Processor pre-test 270 can perform pre-testing of boards 128 to figure out what metrics it is good at and also the memorization of the metrics determined in the past that will accelerate an AutoML optimization process.

Pre-test 270 may use a virtual board to simulate a physical board having processor 128 to accelerate the process of testing on a real board at test 250 which can be slower. Pre-test 270 may model some parts of the processors 128 to more quickly determine if processor programmed with models 122 will meet user targets such as inference time and/or memory usage. If data 158 collected using the virtual board do not meet user constraints 219, this is a negative result. Therefore, training 220 will not train that processor 128 at training 220 or test the processor in model 132 at test 250 based on the negative result.

Pre-test 270 may use requirements that are the user's constraints 219, such as the virtual board has to be at least 20% accurate or 95% accurate to determine negative or positive results. It can pre-determine that optimizer either needs to adjust the models 122 to hit the positive required accuracy or needs to select a different processor that can do that accuracy with the models 122. It can automatically explore virtual versions of models 132 where actual hardware processors 128 are not implemented. It automatically will, for instance, size up and size down the models 122, which affects both the accuracy and the runtime and the power data 158 to steer away from negative results.

Pre-test 270 can store those capabilities and negative and positive results of processors 128 in a silicon library that can be subsequently accessed by optimizer 280 and loop 282 for different ones of models 122 being programmed on prior tested virtual version of processors 128 to more quickly arrive at models 132 and 182.

Pre-test 270 may also use some pre-existing knowledge from the silicon library that is static information about the processors 128 and what models 122 and/or constraints 219 work well on the particular processors 128 based on user input and/or technical specifications.

For processors 128 having negative results at pre-test 270, training 220 might not train, test 250 might not test or optimizer might disregard ones of models 132 having those processors. In some cases, pre-test 270 uses stored information from optimizer 280 noted below, or vice versa.

Pre-testing 270 may determine which types of operations (ops) constituting a model 132 or included in a model 132, are supported by the processor 128 and how efficient that processor is in executing those ops. In one example, if pre-test 270 determines that two operations (e.g., ELU and RELU6 operations) are not supported by the processor 128, optimizer 280 will not (e.g., based on receiving information from pre-test 270 of the non-support) waste time creating and testing models 132 which contain such operations. Instead, optimizer 280 can use a closest alternative for one or both ops (such as RELU). In another example, processors 128 may have a vector processing unit which can significantly accelerate certain model ops. However, these units often have memory limits which when exceeded can cause computational efficiency to drop significantly, such as due to additional memory copying or offloading operation to less efficient memory cores. During pretesting 270, such performances can be revealed and optimizer 280 (based on information from pre-test 270) can exclude and avoid using inefficient configurations.

AutoML tester and optimizer 280 is an optimizer for optimizing the plurality of trained ML hardware models 132 to become an optimized trained ML hardware model 182 using the runtime test metrics data 158 by simultaneously performing the testing of the trained ML hardware models at test 250 and comparing the runtime test metrics data 158 of the plurality of trained ML hardware models 132 during testing at test 250.

Optimizer 280 may be or perform a process of automating the steps of ML to obtain a goal using loop 282 and the datasets from database 213 using data 158 as a way to measure the goal, it may be a way to measure the success of any individual model 132 and then tell loop 282 to iterate to a different or new model 132. So, models 132 may be dozens, hundreds or thousands of models that optimizer 280 processes to comes up with something good based on data 158.

Optimizer 280 has optimization loop 282 for using data 158 to then make better choices on what to try next for models 122 and/or processors 118 to optimize models 132 to become model 182. Loop 282 may adjust the model 122 a little bit if needed or switch to a different chip 128 of models 132 and go with whatever that chip is most efficient at to optimize to model 182. Loop 282 may update to a next selection of models 122 and/or processors 118 for models 132 to optimize those pieces. Loop may send the updated models 132 to test 250 for testing and then repeat based on the data 158 from testing of the updated models 132. Optimizer 280 and loop 282 may automatically determine or be used by a user to determine a combination of one model of models 122, and one processor of processors 128 that are optimal or preferred based on data 158 to optimize models 132 to become model 182. Loop 282 may find a model 132 that maximizes accuracy, minimizes time and/or minimizes the energy, per estimation 156 or at test 250. Optimizer 280 may optimize the models 132 to predict a difference between images having dogs or fruit.

To optimize models 132 to become model 182, optimizing at loop 282 may use a multivariable balancing approach. If only accuracy of estimation is selected, the most accurate model 132 can be selected without trying to minimize the estimation time. Adding in optimizing the time creates a trade-off between how fast and how accurate the model is. Now, optimization loop 282 is going to explore the line of faster models that are less accurate versus slower models that are more accurate and there is a trade-off line that connects those two. Here a user selection can be made regarding the multivariable balance, such as based on customer desires or other factors having to do with a model deployment or custom model. In other cases, an automated and/or user selection can be made.

Optimizing at loop 282 may maximize the accuracy (e.g., the English version) of estimations 156 of models 132 as compared to known test outputs 137, minimize how fast does models 132 predict (the speed) and to minimize how much power is utilize by models 132 to make the estimations. It may minimize the time it takes to do an estimation on a chip and minimize how much power the chip uses and generally maximize the desired maximum metrics.

For example, to select whether it is preferable to have 97% accurate and takes 4.78 milliseconds for an estimation; or to have 90% accurate and takes 1.1 milliseconds. The first may be preferred when safety is involved such as driving a car while the second may be preferred in a rough count situation such as counting fish processed on a fishing ship.

At loop 282, for each of architectures 118 each model 122 can be resized, such as by resizing the width of the layers or the stack of the layers; adding or removing parts of a model 122; and/or adding or removing parts of an architecture 118 to make model 132 work better both for this specific dataset and to work faster for the specific hardware processor 118. So, for running models 122 on a specific chip 118, that specific chip along with it's the SDK (e.g., a Neural Net compiler and/or model runtime engine) that powers it will be good or bad at certain types of metrics 142. For a model 132, if one operation or estimation 156 is significantly faster than the others, loop 282 can spend more time in (e.g., slow down) that type of operation, with all else being equal (e.g., power and accuracy). Loop 282 may gravitate to using that model 132 more often because it is better at that one thing. Loop 282 may go through and figure out what a specific chip 118 is good at and exploit all the things that chip is good at and avoid the things that chip is not good at. The loop 282 also considers constraints of the specific hardware processor 118, like, how much memory it has.

Optimizer 280 and/or loop 282 may design the models 182 and choose what new models 182 to test next, given the results data 158 of how well particular model 132 did on the chips 128 and how well models 132 did in the training process 120. For example, between speed and accuracy of estimations 156, loop 282 may get a 69% accurate model running at 1.3 milliseconds or an 80.6% accuracy at 114 milliseconds. So, the second result is an increase in accuracy, but it is a hundred times slower, which may be unacceptable for model 182. The user or a computing device of optimizer 280 may select an optimal trade-off of the multivariable balancing approach.

Optimizer 280 is able to store in a memory what certain models 132 are good at and what they are bad at based on data 158 to accelerates the optimizing at 280 of future models 132 that use some of processors 128 and/or models 122. This allows using knowledge of things that were optimized at loop 282 in the past for different models 132 for the same or different users or customers. For example, what types of model architectures 118 worked well on particular processor 128 for new datasets that look like the dataset from data 213 used by optimizer on models 132.

Optimizer 280 may be a mathematical apparatus that creates a data driven, probabilistic representation of all prior tested models 132. Each of these prior tested models 132 becomes a training sample, where model 132 configurations (architectural parameters) are treated as inputs and model performance (accuracy, runtime) as outputs to be predicted. Each of these inputs and outputs can subsequently be used as an input and output 112 and/or 137.

Optimizer 280, when proposing a new model 132 or 182, may attempt to create such a model configuration which, according to the internal estimations of optimizer 280 or pre-test 270 will maximize metrics of interest, such as of types of metrics 142 based on data 158. After each model is then trained at 220 and tested at 250, the internal representation of the model is updated by optimizer 280 or loop 282, allowing the optimizer to make better estimations in the future. The optimizer may be bayesian-based or include a Bayesian analysis of data 158.

In some cases, there is only one of processors 128 such as where the same processor will be programmed with a number of models 122 to create models 132. In other cases, there are multiple processors 128. It is possible that optimizing starts with one processor 128 and after testing, another processor 128 is selected.

Optimizer 280 and loop 282 may include descriptions for optimizer 180.

Validator 290 is for creating a validated hardware version 291 of the optimized trained ML hardware model 182 including by writing or "burning" firmware to one of the selected hardware processors 128. Validator 290 may validate the optimized trained ML hardware model 182 to become a validated ML hardware model version 291 by testing the optimized trained ML hardware model 182 with automated simulator inputs and outputs to produce validation test data.

When optimizer 280 and loop 282 finally optimize to one model 182 of models 132, and the one chip of processor 128 that are optimal based on data 158, validator 290 may be used to pretend to produce that combination in the custom model at 295 by writing firmware of that one model into that one processor to create a fully built hardware version 291. Version 291 may be a fully built hardware of a chip 128 with firmware, or BIOS to set up the neural network of optimized trained model 182 running with the camera 211, pre-processing code, post-processing code, a Bluetooth controller chip, a chip that takes input from the camera and resizes the input a chip that performs color correction on the image from the camera, host processing code that reads the output from the ML model 182, batteries, charge ports, control buttons, displays and/or other accessory components that are to be on the custom model at 295.

The fully built hardware version 291 may then be automatically or manually tested by using a simulator, such as a camera 211 imaging a scene 293 of still or video frames. Scene 293 may provide the automated simulator inputs for which there are known automated simulator outputs.

Validator 290 may aim camera 211 of version 291 at a computer display or other screen showing scene 293 and measure how well version 291 actually performs based on measuring data 158. With the camera in place and with the version's exact pre-processing and post-processing code. Similar to descriptions for data collector 110, the inputs may be images having dogs or fruit and the outputs may label whether the image has a dog or fruit.

Model deployment 294 is for deploying a ML hardware model of model 182 and/or version 291 by testing the model 182 or version 291 with customer simulator inputs and outputs to produce deployment test data. Deployment 294 may be similar to validator 290 except the testing is automated and version 291 is a version that customer desires to be the model 295.

Deployment 294 may include automated testing validated version 291 by having version 291 watch a screen displaying images with people walking through a scene and deployment 294 measuring as data 158, what percent of people on the screen are correctly detected by version 291.

Custom model 295 is for customizing the deployed ML hardware model of model 182 and/or version 291 by testing a customer product with that model or version with data of, from or collected for the customer environment 296 to produce customer based test data 158. Customizing at 295 may be similar to validator 290 except the testing is with customer setting or provided inputs and outputs, and the model and version are part of the product hardware of customer desired model 295 for the customer's specific use.

Here, the customer environment may be one that the deployed ML hardware model is not very good at predicting, such as in a restaurant having carpet that happens to look a bit like a person, or a table that is approximately human shaped when the model is trying to detect people. Model 295 may collect more data 158 and then feed data that through optimizer 180 to customize to a custom model 295 specific for the customer's use case.

After validation 290, deployment 294 or model 295, version 291 or optimized trained model 182 may be returned to optimizer 280 for further optimizing to create a new model 182 by further training model 182 by adding the automated or customer simulator inputs and outputs to prior training data or retraining model 182 from scratch with only the automated or customer simulator inputs and outputs. Creating a new model 182 may include collecting at database 213 and labeling at service 216 the automated or customer simulator inputs and outputs to make a new model 182 that is good at doing just that one thing of automated or customer simulator inputs and outputs.

Version 291 and/or model 295 may be a computer product such as a software and/or hardware (e.g., a chip or IC) product as described for optimized trained ML hardware model 182.

As noted, Auto ML systems and processes may be used for hardware-aware ML model creation and optimizing. The AutoML systems may include multi-tenant, large scale AutoML system architectures and usage of such systems for hardware-aware ML model creation. Such AutoML systems may be ML model tide architectures or ML model tide systems that have 3 main component types: a Model Store unit; a Model, Producer and Consumer (MPC) unit; and Model Meta-Services (MMS) unit. Each unit may be or include a computer, a hardware and/or a software unit, module, program, subsystem and/or component.

Figure 2B:
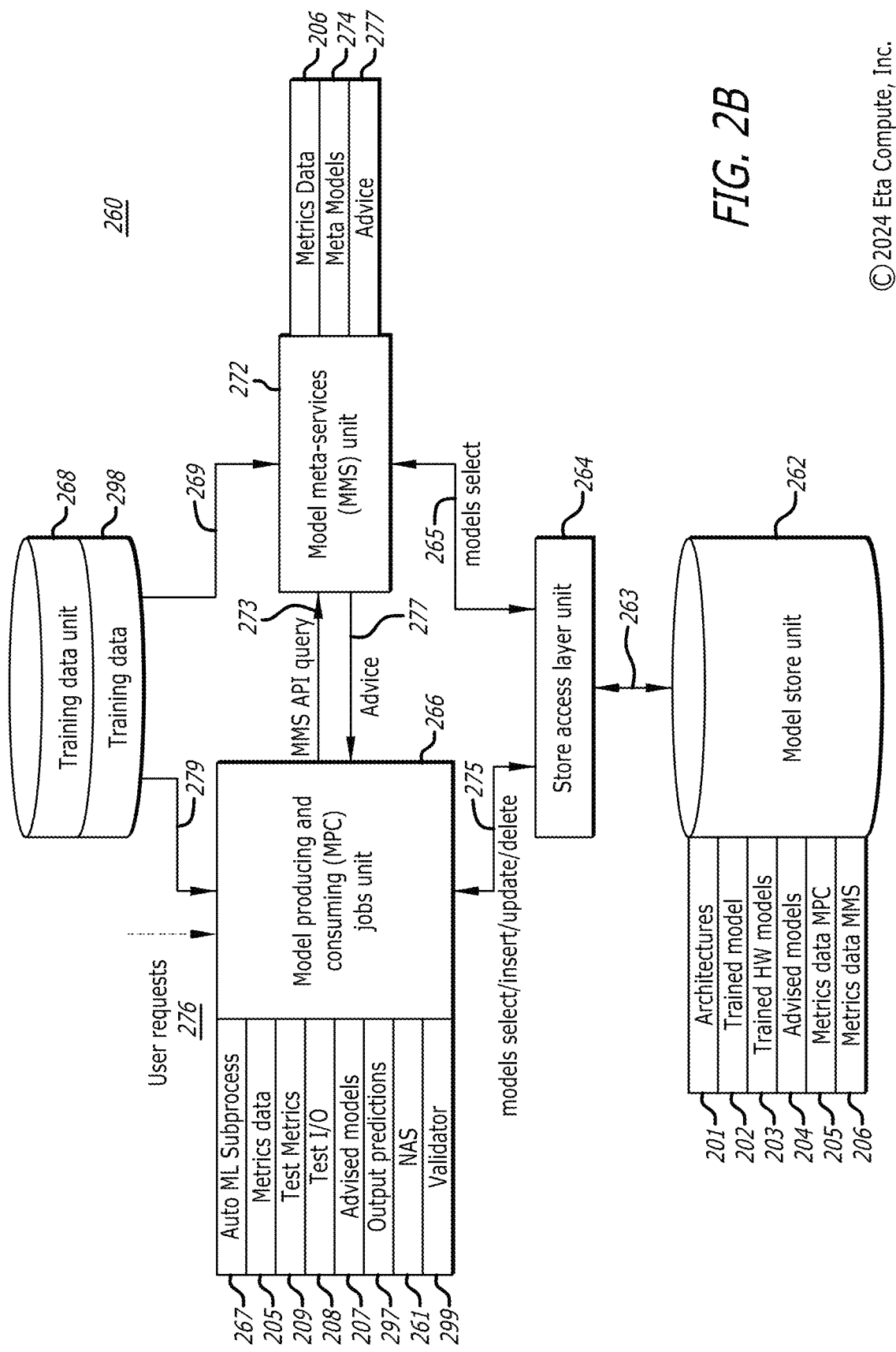
FIG. 2B is a block diagram of a system for automated machine learning (Auto ML) systems and processes for hardware-aware automated ML model creating and optimizing.

For example, FIG. 2B is a block diagram of a system 260 for Auto ML systems and processes for hardware-aware automated ML model creating and optimizing. System 260 includes a Model Store unit 262; a Model, Producer and Consumer (MPC) unit 266; and Model Meta-Services (MMS) unit 272. Each of these units has components or sub-units as noted in FIG. 2B. System 260 may be a system for Auto ML creating and optimizing an ML model 202 or 203 to become an optimized trained ML model 202 or 203 of unit 262, such as using test metrics data 205 of or from testing of the model 202 or 203 by unit 266; or using simulated (e.g., estimated and/or predicted) test metrics data 206 of or from simulated testing of the model 202 or 203 using unit 272. System 260 may alternatively or also be a system for Auto ML creating and optimizing an ML model 207 or 274 to become an optimized trained ML model, such as using test metrics data 205 from testing of the model 207 by unit 266, or using simulated test metrics data 206 and/or advice 277 from simulated testing of the model 274 using unit 272.

A meta-model 274 is different than a model 202 or 203 by taking as training inputs, information obtained from testing ML model models and optimized trained hardware ML models. This information includes accuracy of a model on dataset, runtime information on a hardware processor (inference time, memory consumption, if the model was successfully executed). Meta-models 274 then have a predictive capacity to determine which dependent variables available to Auto ML creating and optimizing an ML models lead to (e.g., can be used to produce) best results given user task definition (metric of success, dataset, hardware chip, constraints). Meta-models 274 do not get deployed on the hardware processor which is programmed with the trained hardware model but they reside inside the AutoML system itself, such as inside the MMS unit 272. Meta-models 274 may not be created by user input or request 276, but may be internally created and maintained by the system 260 or MMS unit 272 and work in the background. The user may not know of or be unaware they exist or are being used. Models 274 can be created and/or updated 1) on a periodic basis, and/or 2) optionally triggered by an event such as enough new datapoints added to the database or until 262.

An advised-model 204 and 207 is different than a model 202 or 203 by using or including advice 277 received from MMS unit 272 in response to query 273, such as advice 277 based on or matching one or more meta-models 274. MPC has a register of available MMS types, which are integrated into MPC execution code. MPC, reaching a certain phase of the AutoML subprocess, will issue a query to the appropriate MMS. In example, during neural architecture search phase MPC can query a model architecture MMS: which model architecture type will execute fastest on selected hardware processor. Similarly, model profiling MMS can be queried on the expected runtime of a model or prior to training of individual models a hyperparameter MMS can suggest which training hyperparameters are most suitable (resulting in highest accuracy or shortest training time) for a model 202 or 203. MMS will respond with a data structure that is intrinsic to its type in example in JSON format. MMS can also give a null answer, meaning that advice for the query is not available. In example profiling MMS may not be able to answer a query regarding expected model runtime on hardware processor X if a meta-model for chip X is not available (e.g. because of insufficient number of data samples in the Model Store Unit 262 for processor X). Advice 277 may include prediction, predicted, simulated and/or expected data as noted herein. Advice 277 may include model creation advice, model recipes, selection of most appropriate models meeting user constraints and task definition from Model Store Unit, predicted best hardware chip, predicted model runtime (inference time, memory usage, numerical accuracy etc.), simulated testing scores, simulated testing metrics data 206, and/or predictions of outputs of models 204 or 207 and/or user requests 276, runtime bottleneck identification (which blocks in a model contribute most to memory consumption or inference time) of a model, unsupported model block replacement. Advice 277 may include how to train, recommended training data and/or hyperparameters of models 204 or 207 and/or user requests 276. MPC using advice from various MMS can eliminate models at early stages of AutoML process due to expected poor accuracy score, incompatibility or poor performance on targeted hardware processor. Using training hyperparameters suggested by MMS advised-model can achieve better accuracy score in less training time. As a result, the AutoML subprocess of MPC is improved because less resources are dedicated to unpromising models (un optimal from the point of view of User request 276) and more toward potentially better advised-models and advised-models are further trained and optimized in a more effective manner.

The multi-tenant and/or large scale system may be used by numerous customers or users to create desired custom ML systems, such as or such as including model 202, model 203 or advised-model 204. The multi-tenant system may be managed by an owner, company or entity to provide numerous customers or users (e.g., the multi-tenants) with their desired custom ML systems. A desired custom ML system may be or include an optimized trained ML system or model on a chip.

The AutoML system may output, create and/or optimize one or more hardware-aware trained ML models, hardware models or advised-models based on a user's input or request 276. The AutoML system or MMS unit 272 may create and/or optimize one or more meta-models without a user's input or request 276. To do this, the AutoML system or MMS unit 272 may access and/or select selected ML model architectures 118 from a set of ML model architectures 117. In some cases, one or more of these optimized trained ML models will be for a single hardware chip type, in other cases it/they will be for more than one hardware chip type. The output of AutoML system 260, such as output of unit 262, unit 272 or unit 266 may be an optimized trained ML model that can be an optimized version of any of models 202, models 203, models 204, models 207 or models 274. Any of these outputs of the AutoML system 260 may be a computer product such as a software and/or hardware (e.g., a chip or IC) product, such as described for optimized trained ML hardware model 182. The output of the AutoML system 260 may be multiple of each, a combination of any of, or a combination of multiple of any of models 202, 203, 204, 207 or 274. The AutoML system 260 (e.g., Model Store unit 262, MPC unit 266; and/or MMS unit 272) and/or trained ML hardware models may be aware of, assist in the selection of and/or select the hardware of the chip or type of chip upon which the trained ML model is developed and created.

The automated ML system 260, units or components thereof may perform all or some of their described functions or actions automatically, which is without user interaction or control except to choose and/or input a user dataset (e.g., training, validating, evaluation and/or testing data), problem statement, desired hardware chip and/or model constraints. In some cases, they perform the functions or actions automatically except for training data 298 and/or user requests 276. The actions of each of the units of system 260 may be performed automatically (without user input) and/or manually. In some cases, these actions are performed automatically by system 260 without user input, except for the user requests 276. In other cases, the user controls the system but does know of the existence of all or some of the system or system units, such as of the model store unit, MPC unit, and/or MMS unit.

The automated ML system 260 or units thereof may be hosted on one or more computers, such as client and or server computers. The computers may be distributed over a network such as a local area network (LAN), network 105, a distributed network, the Internet and/or one or more cloud systems. The system may use AI computers, computing devices, hardware and/or software for any one or more of its units, components, modules, programs, subsystems, etc. The automated ML system may be a computing device or system as noted for system 100 or 200. The units of system 260 may be units as described for units of system 100 or 200.

Useful terminology for the descriptions herein include at least the following:

A user job or user task is or includes a request to the AutoML system which defines the scope, objective and/or limits of a hardware-aware ML model creation process, such as by including one or more of each of the following:

An ML problem that is or includes but is not limited to statistical classification, object detection and/or tracking, key points/landmarks estimation, anomaly-detection, semantic segmentation, re-identification, optical character recognition, natural language processing etc; or a combination of those. Sometimes an application of auto ML models can contain several models which perform partial functions (e.g. One model detects license plates another analyzes them to identify the plate number).

A Dataset that is or includes a collection of labeled data samples of training data, validation data and/or test data splits;

One or more Metrics of success that are or include accuracy, precision, recall, area under the ROC curve (AUC) such as a measurement of the entire two-dimensional area underneath the entire ROC curve, mean average precision (mAP) such as a standard metric to evaluate the accuracy of object detection algorithms, etc.;

A Targeted hardware chip or processor core; and toolchain (e.g., a software development kit (SDK)) version such as a pre-compiled toolchain designed to cross compile packages for a specific target without compiling the whole system from scratch); and/or Runtime constraints such as including inference time limits, and/or memory usage limits, and/or power/energy consumption limit.

System 260 may also be for creating and optimizing a trained ML hardware model 132 or 184 to become an optimized trained ML hardware model 182. System 260 may create models 132 from scratch or optimize existing ones of model 132, 182 or 184. Each of the parts of system 260 may be described as or as including at least one unit, module, engine or computing device. These units of system 260 are all part of one computing device or may be interconnected by data connections such as by network 105. These units of system 260 may each be located on computing devices separate from or on the same computing devices as noted for system 100. System 260 may include one or more units of system 100. System 100 and/or 260 may be a suite of different machines hosted in a cloud computing platform except for some physical nodes that are at other servers and/or clients distributed at different locations. For example, MPC unit 266 may test models 122 on physical boards or processors 128 at one or more different locations. A goal of the system 100 and/or 260 may be to create a model that can distinguish dogs from fruit in images. A goal of the system may be to distinguish bananas from other types of fruit.

System 260 has data connections, conduits or paths for transmitting, receiving and/or sharing data as shown by the solid lines between the units. Each data connection may include data inputs and/or outputs of or at the units. Connection 263 exchanges data of unit 262 between unit 262 and store access layer unit 264. Connection 265 exchanges data of layer unit 264 or unit 262 to unit 272. This data may be or include models selected by unit 272 from layer unit 264 or unit 262. Connections 269 and 279 sends training data 298 to unit 272 and 266, respectively. Connection 273 (e.g., a query) exchanges data of unit 272 to unit 266. This data may be or include an API query from MMS unit 266 to unit 272; and a response to that query from unit 272 to unit 266. Connection 275 (e.g., a query) exchanges data between unit 264 and unit 266. This data may be or include models selected by unit 266 from layer unit 264 or unit 262. This data may be or include models inserted, updated or deleted by unit 266 to layer unit 264 or unit 262. System 260 includes a data connection (dashed line) for unit 266 to receive the user requests 276.

The model store unit 262 of system 260 may be a model store with an access layer application programming interface (API) which contains ML model information. The model store 262 may be implemented as a relational database using structured query language (SQL) as the query language, or in a variety of structured, unstructured or semi-structured data storage techniques.

The model store unit 262 may receive, update, provide and/or contain ML model information for and/or ML models described at 215-282, 320-330, 350, and/or 380-390.

The model producer and consumer (MPC) unit 266 of system 260 may be a unit for processing user jobs to create or which create new ML models, update existing models and/or delete existing models from the store unit 262.

The MPC jobs can be user jobs such as user-requests 276 to MPC unit 266 or continuously running user jobs at MPC unit 266. Some specific implementations of MPC unit 266 include one or more of each of the following:
  a. An AutoML subprocess which sources a limited number of existing models from the Model Store unit 262, which closely match the user task definition and then it trains them in a local hyperparameters search;
  b. A neural architecture search (NAS), which provides a path for the injection of new architecture types into the Model Store 262. These new architecture types may be both created and evaluated by this unit, such as by including one or more of each of the following:
    i. This unit applies its array of NAS techniques to create (and subsequently evaluate) novel architectures, and store these novel architectures together with their metrics into the Model Store;
    ii. As the research community develops new NN architectures, they can be easily injected into the Model Store via this unit; and/or iii. As new NAS methods are introduced, these methods may be included within the library of techniques used by this unit.
  c. Custom, specific architecture training (user specified models);
  d. State-of-the-art/industry standard model architecture families (e.g. MobileNets, Resnets, Yolo, ViT, etc.) and various sizes within the architecture family; and/or
  e. Model evaluation job, which can bump models up the information completeness ladder. (e.g., Information Completeness Ladder of FIG. 5)

Note that points a) and b) (iii) above for unit 266 may in practice be merged into a single process: such as a process of creating a new ML model using the NAS, then training that model using an AutoML subprocess with hyperparameters optimization.

MPC Unit 266 includes auto ML subprocess 267. The auto ML subprocess 267 may include model training and test subprocesses. MPC Unit 266 includes NAS 261.

MPC Unit 266 may run one or more of each of items a-e above when queried, commanded or prompted to by requests or jobs 276 through and provide the response through a connection sending jobs 276. The response or output of unit 266 may go to store unit 262 through connections 275.

MPC Unit 266 may query data 268 such as for any items a-e above, such as item 2.a through connection 279. MPC Unit 266 may query or source models from layer 264 such as for any items a-e above through connection 275, layer 264 and/or connection 263. MPC Unit 266 may write, inject and/or create models in unit 262 such as for any items a-e above through connection 275, layer 264 and/or connection 263. The MPC unit 266 may create, update and/or delete ML models described at 215-282, 320-330, 350, and/or 380-390.

The model meta-services (MMS) unit 272 of system 260 may be a unit of or for processes which use knowledge or ML models accumulated in the Model Store 262 to create implicit and servable representations of that knowledge. These representations may include any data stored at unit 262; metrics data 206; and/or models 274 and 204. These representations inform, are or create meta-models 274 that serve and improve operation of MPC jobs of MPC unit 266, such as by speeding up or increasing the output quality of user jobs of unit 266. Specific implementations of MMS unit 272 may include one or more of each of the following:
  a. A software-in-the-loop profiling simulation, which estimates runtime performance of a given model when executed on a hardware chip;
  b. Prediction of model accuracy for a given model architecture and dataset;
  c. Prediction of neural architecture search constraints;
  d. Prediction of best training hyper-parameters for a given model and dataset;
  e. Detection of optimal early-stopping point in model training;
  f. Predictive optimal architecture generation;
  g. Predictive proposal of optimal model search strategy, given compute budget constraints (exploration vs exploitation); and/or
  h. Training fault prediction model.

The implementation of an individual MMS unit 272 can be a traditional procedural/rule-based unit, an algorithm-based unit or a ML unit approach that is trained on meta-data from the Model Store 262. Unit 272 may be a combination of two or three of these approaches.

MMS Unit 272 may include meta-models 274. The meta-models 274 may include meta-model training and test subprocesses. MMS Unit 272 may run one or more of each of items a-h above as advice 277 when queried, commanded or prompted to by MPC unit 266 through and provide the response through connection 273. Each of items a-h of MMS Unit 272 above may be an AI model to learn the function of that item at unit 272. Each of items a-h of MMS Unit 272 above may perform a simulation of the HW (hardware) model, HW model training and/or HW model testing that does not include using an actual hardware chip. Each may simulate the functions and/or performance of the chip or chip type. Meta-model 274 is part of MMS that may simulate and/or estimate how well HW models works on a chip. This simulation data or any of items a-h above may be part of advice 277 that unit 272 responds with to a query 273, such as for a matching ML model.

The MMS unit 272 may use ML models of Model Store 262; create implicit and servable representations of that knowledge; and/or to create meta-models 274 of ML models described at 215-282, 320-330, 350, and/or 380-390.

System 260 includes store access layer unit 264 for providing units 266 and 272 access to data of store unit 262.

MMS unit 272 can query the store access layer 264, which consequently accesses model store unit, using REST API. The query defines constraints for architecture and model weights selection e.g.: runtime limits on a selected chip and/or memory limits on a selected chip, if given architecture even tested on selected chip, value(s) of metric achieved by given model on selected dataset and sorting order.

Layer unit 264 may communicate ML model data and models of Model Store 262 (e.g., described at 215-282, 320-330, 350, and/or 380-390) to and from units 266 and 272. Layer unit 264 may communicate ML model data and models of Model Store 262 to and from units 266 and 272.

System 260 includes training data unit 268 for providing units 266 and 272 access to training data of unit 268 for the models.

MMS and MPC access training data from the training data unit 268, transferring it to the local compute unit of the MMS/MPC, where it can be further elaborated on. Transfer typically happens over network connection or the internet. Accessing training data by MPS may require user authorization (user authorization key or token), as to restrict AutoML subprocess access to only the data owned by the user or public data.

Data of unit 268 may include a user dataset for training, validating, evaluation and/or testing an ML model such as described at 215-282, 320-330, 350, and/or 380-390.

System 260 may be a system for Auto ML creating and optimizing a ML meta-model 274 to become an optimized ML meta-model 274, such as using simulated (e.g., estimated and/or predicted) test metrics data 206 of or from simulated testing of the ML meta-model 274 using unit 272. The meta-model for system 260 may represent an architecture 201, model 202, model 203, model 207 and/or model 204; and the creating and optimizing is for that type of ML model.

System 260 may be a system for Auto ML creating and optimizing a ML advised-model 274 to become an optimized ML advised-model 204, such as using test metrics data 205 of or from testing of the ML meta-model 274 by unit 266. The advised model for system 260 may represent an architecture 201, model 202 and/or model 203; and the creating and optimizing is for that type of ML model.

The system 260 may create and optimize ML models described at models 118, 122, 132, 184 and 182.

Model store unit 262 may be for storing ML advised models. Unit 262 may be for receiving, storing and providing access to ML model architectures 201, such as sent by MCP unit 266. Unit 262 may be for storing trained ML models 202 and trained ML hardware models 203 derived from ML model architectures, such as trained ML models 202 and trained ML hardware models 203 created using or by training ML model architectures. Unit 262 may be for receiving, storing and providing access to runtime test metrics data 205 and 206 corresponding to each of the stored trained ML models 202 and trained ML hardware models 203, such as sent by unit 266 and 272, respectively. Unit 262 may be for receiving, storing and providing access to ML advised-models 204 created based on the runtime test metrics data 205 and 206. In other cases, the advised-model for unit 262 represents an architecture 201, model 202 and/or model 203; and the storing is for that type of ML model.

Model store unit 262 may receive, store and provide access to ML model data and models of Model Store 262 as described for models 118, 122, 132 and/or 182. The model store unit 262 may receive, update, provide access to and/or contain ML model information for and/or ML models described at models 118, 122, 132, 184 and/or 182.

Unit 262 may include a store access layer unit 264 for providing the receiving and providing access.

Layer unit 264 may communicate ML model data, model architectures and models of model store unit 262 as described for communication or use of models 118, 122, 132, 184 and/or 182.

MMS unit 272 may be for creating and optimizing ML meta-models 274, such as to be used to create ML advised-models 204. Unit 272 may be for accessing the trained ML models 202 and/or trained ML hardware models 203 (or, optionally models 204), such as from unit 262. Unit 272 may be for accessing the runtime test metrics data 205 and/or 206 corresponding to the trained ML models and/or trained ML hardware models, such as from unit 262. Unit 272 may be for creating the ML meta-models 274 that are created using or based on the runtime test metrics data 205 and/or 206 corresponding to each of the stored trained ML models 202 and/or trained ML hardware models 203. Unit 272 may be for creating the ML meta-models 274 which includes simulating (e.g., creating, testing, estimating and/or predicting) simulated ML meta-model test metrics data 206 of (e.g., for) the trained ML models 202 and/or trained ML hardware models 203 using the runtime test metrics data 205. Unit 272 may be for creating the ML meta-models 274 which includes training ML meta-models 274 with (e.g., using) training data 298 of the trained ML models 202 and/or the trained ML hardware models 203 (and optionally of the and the trained ML advised-models); simulated testing the trained ML meta-models 274 to create the simulated ML meta-model test metrics data 206; comparing (e.g., performance of) the simulated ML meta-model test metrics data 206 to the runtime test metrics data 205 of unit 262 or validation data of unit 268 corresponding to each of the stored trained ML models 202 and/or stored trained ML hardware models 203.

In some cases, data 206 is compared to metrics data 205 of stored prior ML advised-models 204 or other models at unit 262. When (e.g., if) the simulated test metrics data 206 is better (e.g., performs better, such as performs more quickly, more accurately, requires less memory) than the runtime test metrics data 205, unit 272 may update and store the better simulated ML meta-models 274 at unit 272 such as to provide advice 277 unit 266 in response to query 273 to create or update to a better version of model 207 or 204. When (e.g., if) the simulated test metrics data 206 is better, unit 272 may update and store the better simulated runtime test metrics data 206 at unit 272 such as to provide advice 277 unit 266 in response to query 273 to create or update to a better version of model 207 or 204. In some cases, unit 272 stores the better and worse models, regardless of which is best.

In some cases, MMS unit 272 may be for accessing the ML advised-models 204 from unit 262; creating simulated test metrics data 206 corresponding to the ML advised-models 204; then optimizing the meta-models 274 by updating the ML meta-models 274 based on the corresponding test metrics data 206.

MMS unit 272 may create and optimize ML meta-models 274 as described for models 118, 122, 132 and/or 182. The MMS unit 272 may use ML models of Model Store 262; create implicit and servable representations of that knowledge; and/or to create meta-models 274 of ML models described at or for models 118, 122, 132, 184 and/or 182.

Unit 262 or 272 may include a software in the loop profiling proxy for performing the creating, training, testing and comparing of the ML models.

MPC unit 266 may be for using and/or testing the ML models, such as models 204 accessed from unit 262 via query 275 or models 207 of unit 266, such as using advice 277. In some cases, unit 266 may be for (e.g., using store unit 262 and/or access layer unit 264) accessing or searching the model store unit 262 for and selecting a selected ML advised-model 207 from the ML advised-models 204. Also, unit 266 may be for querying 273 the MMS unit 272 for and receiving advice 277 related to, for and/or matching a selected ML advised-model 207 from the unit 272. Unit 266 may be for selecting ML test inputs and ML test outputs 208 for testing the selected ML advised-model 207. Unit 266 may be for selecting types of test metrics 209 for testing the selected ML advised-model 207. Unit 266 may be for testing the selected ML advised-model 207 using the ML test inputs and ML test outputs 208 to provide runtime test metrics data 205 for the selected types of test metrics 209. The runtime test metrics data 205 are for ML output predictions 297 made by the selected ML advised-model 207 when input with the ML test inputs of 208, as compared to the outputs of 208. In some cases, data 205 is compared to metrics data 205 of stored prior ML advised-models 204. Unit 266 may be for optimizing the selected ML advised-model 207 to become an optimized ML advised-model 204 using the runtime test metrics data 205; sending the optimized ML advised-model 204 to the model store unit 262 for storing as one of the stored ML advised-models 204; and sending the runtime test metrics data 205 to the model store unit 262 for storing as part of the runtime test metrics data 205 at unit 262.

Optimizing by unit 266 may be by selecting a new selected ML advised-model 207 using or based on advice 277; or updating the current selected ML advised-model 207 using the runtime metrics test data 205 or advice 277.

Unit 266 may be for using and/or testing ML models 202 and/or 203 using advice 277. Unit 266 may be for using and/or testing ML models 122 and/or 132 using advice 277.

Unit 266 may use and/or test the ML advised-models 207 as described for models 118, 122, 132, 184 and/or 182. The MPC unit 266 may create, update and/or delete ML models described at models 118, 122, 132, 184 and/or 182.

Unit 266 includes a neural architecture search (NAS) unit 261 for sending new ML model architectures to the model store unit 262. NAS unit 261 may be for sending trained ML models 202 and the trained ML hardware models 203 (and the trained advised models 207) to the model store unit 262.

Unit 266 includes an Auto ML subprocess 267 for using and/or testing the ML advised-models 207. In some cases, unit 266 and/or the Auto ML subprocess 267 testing the selected ML advised-model 207 includes: training the selected ML advised-model 207 with training data 298. This training data may be from or of the trained ML models 202 and the trained ML hardware models 203. After training, testing the selected ML advised-model 207 to create the ML advised-model test metrics data 205; comparing the selected ML advised-model test metrics data 205 to the prior runtime test metrics data 205 of unit 262 or validation data of unit 268 corresponding to the stored ML advised-model 207. In some cases, data 205 is compared to metrics data 205 of stored prior ML advised-models 204. The using, testing, training and comparing may use or be based on advice 277. In some cases, whether or not the test metrics data 205 is better than the runtime test metrics data 205 of unit 262, the selected ML advised-model 207 is sent to the model store unit 262 for storing as the stored ML advised-model 204, and the runtime test metrics data 205 is sent to the model store unit 262 for storing as part of the runtime test metrics data 205 at unit 262.

In some cases, the models (advised or non-advised) are stored in the model store unit 262 regardless of whether they perform better or not. Thanks to this, the meta-models which are trained on the model store records can differentiate between what constitutes a good or a bad model.

MPC unit 266 may include validator 299 for creating a validated version of the stored ML advised-model 204 by writing firmware including the model 202, 203 or 204 of unit 262 to a selected hardware processor, such as one of processors 201.

Training data unit 268 is for providing training data to units 272 and 266. For unit 266 and/or unit 272, the training data 298 may be from training data unit 268 and may be or include an AutoML subprocess with hyperparameters optimization, a local hyperparameters search or a collection of labeled data samples of training data of the trained ML models 202 and the trained ML hardware models 203. In some cases, the testing is using a dataset that is or includes a collection of labeled data samples of training data, validation data and/or test data splits (e.g., expected test outputs and corresponding test inputs) for or of the trained ML models 202 and/or the trained ML hardware models 203. Training data 298 may have more training data than evaluation or validation data. Training data 298 may be 80% training data and 20% evaluation or validation data.

Data 298 of unit 268 may include a user dataset for training, validating, evaluation and/or testing an ML model such as described at or for models 118, 122, 132, 184 and/or 182.

In some cases, training inputs and outputs 112 may be part of data 298; architectures 117 or 118 may be architectures 201; models 122 may be part of models 202; models 132 may be part of models 203; test inputs and outputs 137 may be part of inputs and outputs 208; test metrics 142 may be part of test metrics 209; predictions 156 may be part of predictions 297; test metrics data 158 may be part of data 205; the optimizer 180 may be part of system 260, MPC unit 266 or Auto ML subprocess 267; and/or optimized trained models 182 may be part of any of models 202, models 203 or trained ML advised-models 204. In some cases, models 204 or 207 can be used in place of architectures 118, models 122, or in place of models 132 or model 182. In some cases, training database 213 or training 220 may be part of unit 268; architecture library 215 may be part of architectures 201; models being optimized by system 200 at 280 and/or 282 may be part of models 202, models 203, models 204, or models 207; the optimizer 180 and/or loop 282 may be part of system 260, MPC unit 266 or Auto ML subprocess 267; and/or pretest 270 may be part of system 260, store unit 262, MPC unit 266 and/or MMS unit 272.

Figure 3:
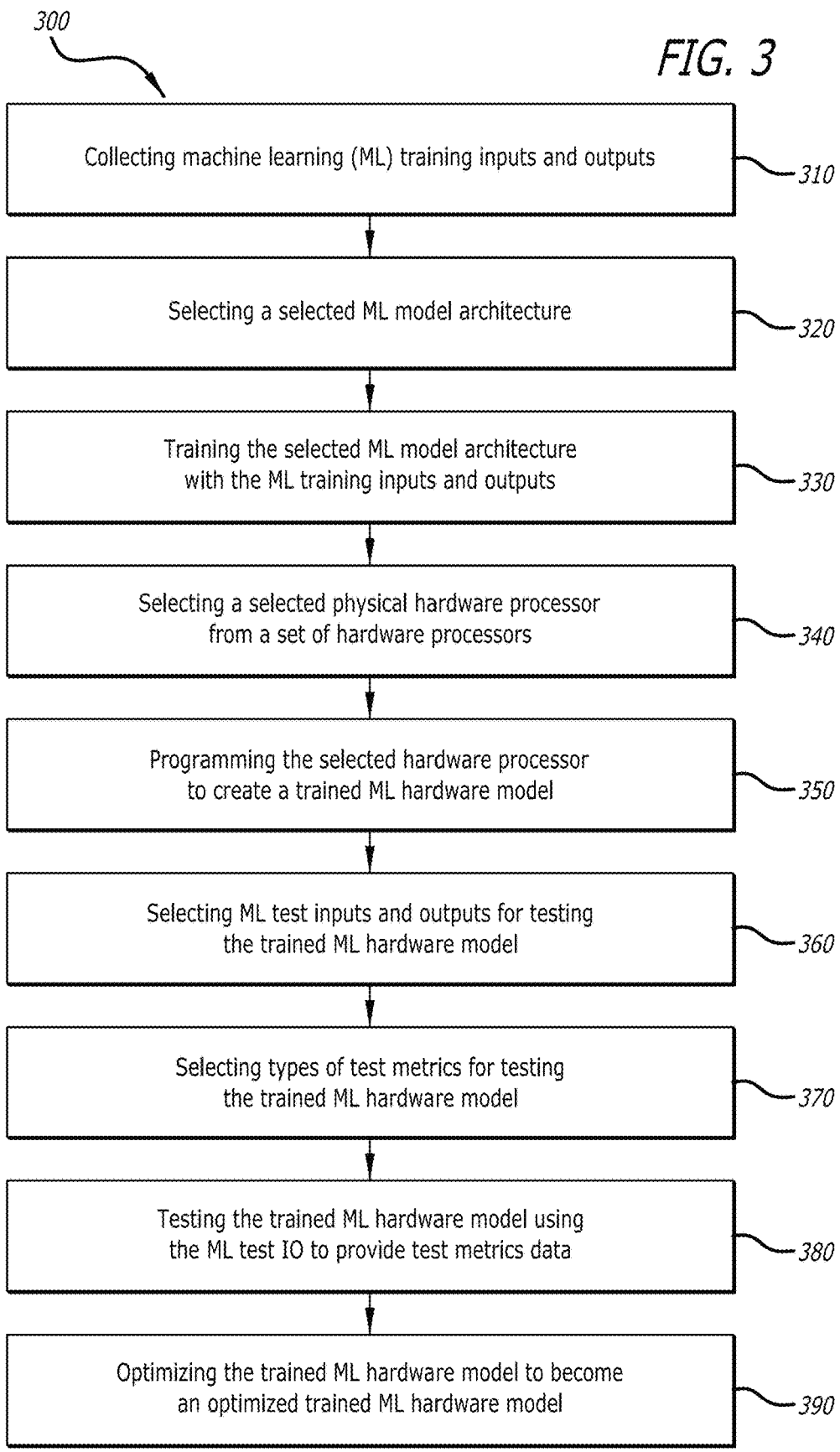
FIG. 3 shows a flow chart of an operating environment or process flow for optimizing a trained ML hardware model to become an optimized trained ML hardware model.

FIG. 3 shows a flow chart of an operating environment or process flow 300 for optimizing a trained ML hardware model 132 to become an optimized trained ML hardware model 182 using runtime test metrics data 158 from testing at 150 of a trained ML hardware model 132 of a selected hardware processor 128. Flow 300 may be performed by one or more of units of system 100 and/or 200. The flow 300 starts at step 310 and can end at step 390, but the process can also be cyclical by returning to step 310 after step 390. For example, the process may return to be performed multiple times to change model, processor, training I/O, test I/O, metric types or testing over time. In some cases, optimizing flow 300 starts with one selected processor 128 at step 340 and after testing at 380, another processor 128 is selected such as during optimizing at step 390. Process 300 may return to step 320 or 340 after step 380 or 390.

Step 310 is collecting ML training inputs and ML training outputs 112 for training an ML model 122. Step 310 may be performed by collector 110 or 210. The inputs may be, for example, media, image frames, video and/or audio data; and the outputs may be labels used to train architectures 118 to be models 122. Collecting at 310 may include automatically creating metadata for the ML training inputs and the ML training outputs, and labels for the ML training inputs and the ML training outputs; and storing the ML training inputs, the ML training outputs, storing the metadata, and storing the labels in a ML model database.

Step 320 is selecting a selected ML model architecture 118 or template from a set of ML model architectures 117. Selecting at 320 may include accessing architectures 117 prior to selecting architecture 118. At least three selected ML model architectures may be selected at step 320. Step 320 may be performed by selector 115 or library 215.

Step 330 is training a trained ML model 122 by training the selected ML model architecture 118 with the ML training inputs and the ML training outputs 112 to make ML output estimations 124 based on ML inputs. Step 330 may be performed by setup 120 or training 220.

Step 340 is selecting a selected physical hardware processor 128 or chip from a set of hardware processors 126. Selecting the selected hardware processor may be selecting at least three selected hardware processors. Step 340 may be performed by selector 125, training 220, test 250 or optimizer 280.

Step 350 is programming the selected hardware processor 128 to create a trained ML hardware model 132 by inputting the selected hardware processor 128 with the trained ML model 122. Step 350 may be performed by device 130, training 220, test 250 or optimizer 280.

Step 360 is selecting or collecting ML test inputs and ML test outputs 137 for testing the trained ML hardware model 132. Step 360 may be performed by selector 135, test 250 or optimizer 280.

Step 370 is selecting types of test metrics 142 for testing the trained ML hardware model 132. The types of test metrics may be power/energy, performance and/or accuracy performance measurements; optimization objectives; model constraints; and/or performance constraints. The types of test metrics may include multi-objective optimization, such as for power/energy, speed and accuracy of estimations 156 by the trained ML hardware model 132. Step 370 may be performed by selector 140 or metrics 240.

Step 380 is testing the trained ML hardware model 132 using the ML test inputs and ML test outputs (e.g., IO) 137 to provide runtime test metrics data 158 for the selected types of test metrics 142 when the data 158 are for ML output estimations 156 made by the trained ML hardware model 132 as compared to the outputs 137 for the ML test inputs 137. The runtime test metrics data 158 may predict speed, power/energy required and accuracy for an input 137 as compared to a known or labeled output of 137. The runtime test metrics data 158 may predict metrics during all of the test inputs and outputs; or may predict the metrics during one or more estimations 156. Step 380 may include collecting and/or storing the runtime test metrics data 158 from the testing in a memory for access by an optimizer. Testing the trained ML hardware model may include testing that occurs without modeling a runtime or limits of the selected hardware processor 128.

In one example, testing at step 380 may include the trained ML hardware model 132 watching videos on a monitor and numerically measuring runtime test metrics data 158 of how well the model performs, such as benchmarking of a computer vision of object detection and tracking by the model 132 counting (e.g., of people, dogs, fruit, cars, etc.) by the trained ML hardware model 132.

Testing at 380 may also include testing the trained ML hardware model 132 in real-time during an AutoML process and using Bayesian optimization on the trained ML hardware model. Each model trained at 330 may be a data sample, which has decision variables (namely architectural and training parameters) and the outputs (model performance: accuracy, runtime and memory usage on a given processor etc.). This data sample (e.g., the variables as inputs and the outputs as outputs) may be used as training IOs 112 and/or test inputs/outputs 137.

A Bayesian algorithm of the optimizer or optimizer loop may build a statistical model using the a-priori knowledge (all tested models 132 as data samples, such as for training and/or test IOs) and then infer, from that statistical model, which values of parameters (e.g., decision variables) will result in a best performing model 122 on a given processor 128, such as to determine model 182 from models 132.

Step 380 may be performed by setup 150 or test 250.

Step 390 is optimizing the trained ML hardware model 132 to become an optimized trained ML hardware model 182 using the runtime test metrics data 158. Step 390 may include optimizing by using (e.g., based on) the runtime metrics test data 158 to select a new selected ML model architecture 118, select a new selected hardware processor 128, and/or update the trained ML model 132. Step 390 may include re-testing and re-performing optimizing the selected new selected ML model architecture, selected new selected hardware processor, and/or updated model 132 to be a new trained ML model to select a new optimized trained ML hardware model 182 using or based on the runtime test metrics data 158 of the new model 132.

The final, created ML hardware model 182 may be a faster, lower-power and/or more accurate model as compared to the trained ML hardware model 132. Step 390 may include programming processor 128 with an optimized firmware of the ML of optimized trained model 182. Step 390 may be performed by optimizer 180, selector 125, optimizer 280 or loop 282.

Step 380 and/or 390 may include repeatedly testing the trained ML hardware model 132 or 203 in a testing loop 282 to automatically create the optimized trained ML hardware model 182 or 203 of unit 262 for the ML test inputs and ML test outputs 137 and for a target selected hardware processor 128 using the runtime test metrics data 158 or data 298.

Figure 4:
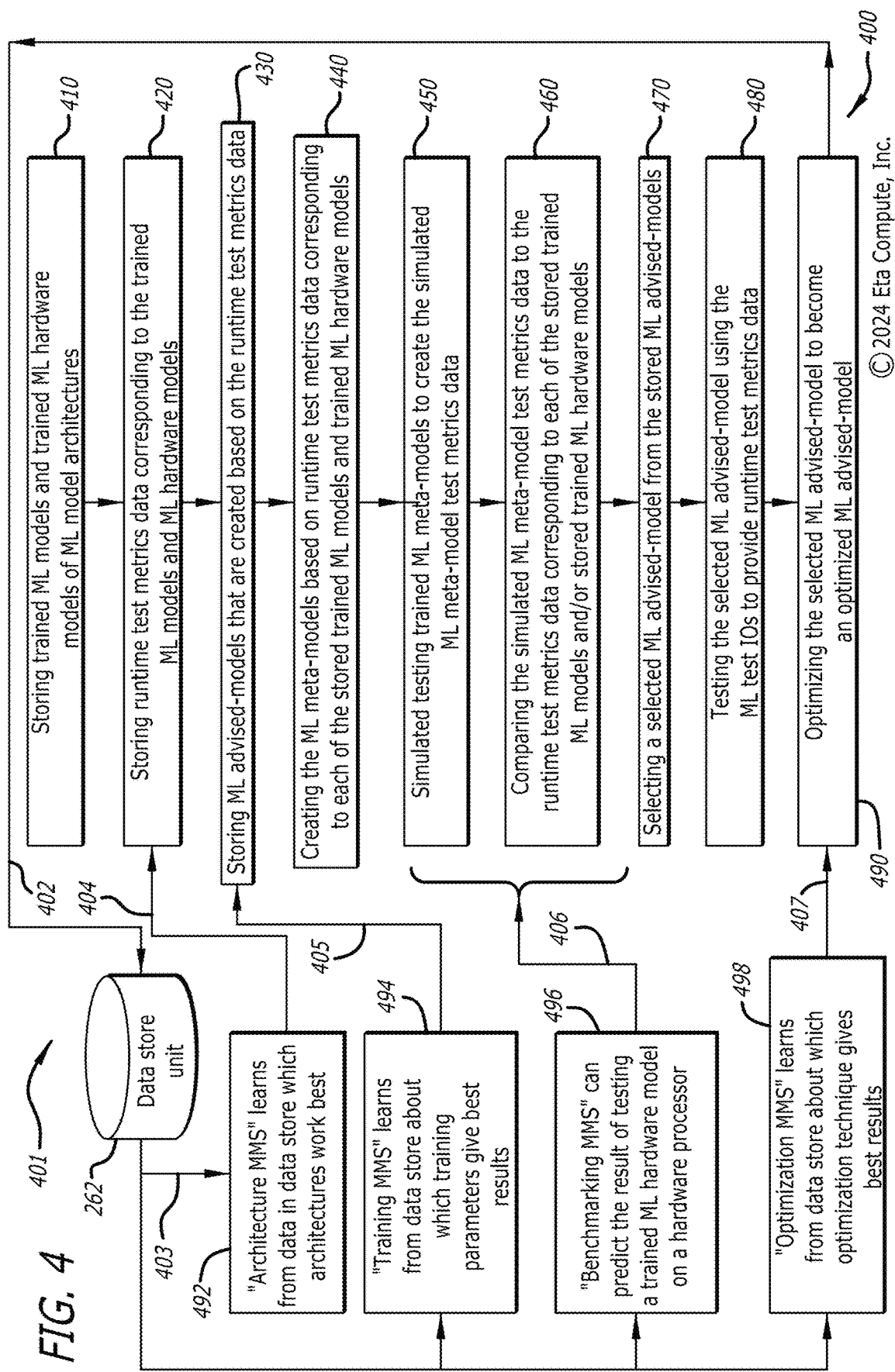
FIG. 4 shows a flow chart of an operating environment or process flow for Auto ML creating and optimizing.

FIG. 4 shows a flow chart of an operating environment or process flow 400 for Auto ML creating a ML model and/or optimizing a ML model to become an optimized trained ML model. Flow 400 may include simultaneously and automatically performing Auto ML using simulated (e.g., estimated or predicted) or actual test metrics data of or from simulating or testing of the ML meta-model 274 or ML advised model 207, respectively. Flow 400 may be performed by system 260. The flow 400 starts at step 410 and can end at step 490, but the process can also be cyclical by returning to step 410 after step 490. The flow 403 of information from data store unit 262 to example MMS instances 492, 494, 496, 498 (e.g., during an MMS process) can happen synchronously or asynchronously from the flow 410-490. It may be synchronous if MMS instance needs to access data store unit 262 upon request from MMS in the 410-490 flow (e.g., during an MPC process), which is typically triggered by the user request 276. In may be asynchronous if MMS instances or advice are trained on data from data store unit 262 for example on periodic bases. For example, the MPC process (e.g., a process by MPC unit 266) may return to be performed multiple times to create and optimize more than one ML model 274 from which advice 277 is based on and is used to create one or more optimized advised ML models 207, while the MMS process may be executed a single time in that time frame of steps 410-490 creating models 207. In some cases, flow 400 can return from any of its steps to any of its prior steps.

In some cases, the ML meta-model 274 does not "become" a meta-model 204, but is used to simultaneously (or within the same flow, at least) optimize a ML model 207 or 204 and improve a meta model 274. In some cases, meta-models 274 do not become advise-models 207 or 204. Meta-models 274 may represent collective knowledge about what works well and what does not work well when it comes to creating models 207 or 204, and give advice 277 to the 410-490 steps so that they can create better or optimized models 207 or 204 (e.g., see left side of FIG. 4). That is models 207 and 204 are called "advised" due to MMS advice 277 (via meta-models 274) advising MPC unit 266 to create advised and/or optimized ML models 207 or 204. In light of this, the MPC flow on the right of FIG. 4 and the MMS flow on the left of FIG. 4 can perform asynchronously from each other. They can also perform synchronously. In some cases, "creating" models 207 and 204 may be or include creating, improving and/or optimizing models 207 and 204.

Flow 400 may be or include Auto ML creating and optimizing an ML meta-model 207 to become an optimized trained ML meta-model 204, such as using advice 277 and test metrics data 205 of or from testing of the model meta-model 207 by unit 266. In some cases, flow 400 may include Auto ML creating and optimizing an ML model 202 or 203 to become an optimized trained ML model 202 or 203 of unit 262, such as using advice 277 and test metrics data 205 of or from testing of the model 202 or 203 by unit 266.

Flow 400 may also create and optimize ML models described at 215-282, 320-330, 350, and/or 380-390.

Step 410 is storing at model store unit 262 trained ML models 202 and trained ML hardware models 203 of ML model architectures. Step 410 may include receiving, storing and providing access to trained ML models 202 and trained ML hardware models 203. Step 410 may include receiving, storing and providing access to ML model architectures 201, such as sent by MCP unit 266.

Step 420 is storing at model store unit 262 runtime test metrics data 205 and 206 corresponding to each of the stored trained ML models 202 and trained ML hardware models 203. The metrics data may be sent by units 266 and 272, respectively. Step 420 may include receiving, storing and providing access to runtime test metrics data 205 and 206 corresponding to each of the stored trained ML models 202 and trained ML hardware models 203, such as sent by unit 266 and 272, respectively.

Step 430 may be storing at model store unit 262 ML advised-models 204 that are created based on the advice 277, and/or runtime test metrics data 205 and 206. Step 430 may include receiving, storing and providing access to ML advised-models 204 that are created based on advice 277, and/or the runtime test metrics data 205 and 206, such as sent by units 266 and 272.

Steps 410-430 may be performed by Store unit 262, such as upon receiving data from MMS unit 272 and/or MPC 266.

Steps 410-430 may also receive, update, provide and/or contain ML model information for and/or ML models described at 215-282, 320-330, 350, and/or 380-390.

Steps 410-430 may also communicate ML model data and models of Model Store 262 (e.g., described at 215-282, 320-330, 350, and/or 380-390) to and from units 266 and 272.

Step 440 is creating the ML meta-models 274 based on the runtime test metrics data 205 and/or 206 corresponding to each of the stored trained ML models 202 and/or trained ML hardware models 203. Step 440 may include accessing the trained ML models 203 and/or trained ML hardware models 203 from unit 262. Step 440 may include accessing the runtime test metrics data 205 and/or 260 corresponding to the trained ML models and/or trained ML hardware models from unit 262.

Step 440 may include creating the ML meta-models 274 that are created using or based on the runtime test metrics data 205 and/or 206 corresponding to each of the stored trained ML models 202 and/or trained ML hardware models 203. Step 440 may include creating the ML meta-models 274 which includes simulating (e.g., creating, testing, estimating and/or predicting) simulated ML meta-model test metrics data 206 of (e.g., for) the trained ML models 202 and/or trained ML hardware models 203 using the runtime test metrics data 205. Step 440 may include creating the ML meta-models 274 which includes training ML meta-models 274 with (e.g., using) training data 298 of the trained ML models 202 and/or the trained ML hardware models 203 (and optionally of the and the trained ML advised-models).

Step 440 may include MMS 272 accessing the ML model architectures 201; accessing the trained ML models 202 and trained ML hardware models 203; accessing the runtime test metrics data 205 and/or 206 corresponding to the trained ML models and trained ML hardware models; creating and updating or replacing ML meta-models 274 based on the runtime test metrics data corresponding to ML model architectures, the stored trained ML models, trained ML hardware models and ML advised-models and runtime test metrics; and/or answering to MPC queries 273, such as by outputting advice 277 on creation, training and optimization of ML advised-models 207.

In some cases, the ML advised-models 207 and/or 204 are conceptually identical the other ML models but they were created by unit 272 using MMS advice 277 so they will perform better by average and they costed less resource to create. In some cases, the ML advised-models 207 and/or 204 are defined as the artifact or noun that is the output of the MPC, where the MPC has taken the advice 277 of the MMS unit 272.

Step 450 is simulated testing the trained ML meta-models 274 to create the simulated ML meta-model test metrics data 206. As noted, types of data A-G may be provided by the MMS unit 272 during simulated testing of a simulated test run of a trained meta-model 274 for a same certain or different model architecture and/or target chip. The simulated testing may produce advice 277 including or based on data 206.

Step 460 is comparing (e.g., performance of) the simulated ML meta-model 274 test metrics data 206 to the runtime test metrics data 205 of unit 262 or validation data of unit 268 corresponding to each of the stored trained ML models 202 and/or stored trained ML hardware models 203. In some cases, data 206 is compared to metrics data 205 of stored prior ML meta-models 204. Step 460 may include that when (e.g., if) the simulated test metrics data 206 is better (e.g., performs better, such as performs more quickly, more accurately, requires less memory) than the runtime test metrics data 205, sending the simulated ML meta-models 274 to the model store unit 262 for storing as the stored ML meta-models 204; and/or sending the simulated runtime test metrics data 206 to the model store unit 262 for storing as part of the simulated runtime test metrics data 206 at unit 262. The comparing may produce advice 277. In some cases, step 460 includes sending the simulated ML meta-models 274 to the model store unit 262 for storing as the stored ML meta-models 204; and/or sending the simulated runtime test metrics data 206 to the model store unit 262 for storing as part of the simulated runtime test metrics data 206 at unit 262, regardless of whether the simulated test metrics data 206 is better than the runtime test metrics data 205.

Comparing at 460 may include, storing the simulated ML meta-models 274 at unit 272, and storing the simulated runtime test metrics data as part of advice 277 at unit 272 for responding to queries 273 from the MPC.

In some cases, steps 440-460 may be accessing the ML meta-models 204 from unit 262; creating simulated test metrics data 206 corresponding to the ML meta-models 204; then optimizing the meta-models 204 by updating the ML meta-models 204 based on the corresponding test metrics data 206.

Steps 440-460 may be performed by MMS unit 272.

Steps 440-460 may also use ML models of Model Store 262; create implicit and servable representations of that knowledge as advice 277; and/or to create meta-models 274 of ML models described at 215-282, 320-330, 350, and/or 380-390.

Step 470 is selecting a selected ML advised-model 207 from the ML advised-models 204 stored at unit 262, such as using advice 277 for models 274 at unit 272. Step 470 may include (e.g., using store unit 262 and/or access layer unit 264) accessing or searching the model store unit 262 for and selecting a selected ML advised-model 207 from the ML advised-models 204. Step 470 may include querying 273 and receiving advice 277 from the MMS unit 272; then selecting a selected ML advised-model 207 based on advice 277. Step 470 may include selecting ML test inputs and ML test outputs 208 for testing the selected ML advised-model 207. Step 470 may include selecting types of test metrics 209 for testing the selected ML advised-model 207 of unit 266.

Selecting at 470 may be or include selecting the selected ML advised-model using advice received by the MPC from the MMS; or selecting the selected ML advised-model using the simulated metrics test data. Selecting at 470 may be or include selecting a selected ML advised-model using advice received from the MMS regarding at least one of the created ML meta-models.

Selecting at 470 may be or include selecting a selected ML advised-model from the ML advised-models 204 or 207; or selecting trained ML models 202 or 203 in absence of ML advised-models or in absence of MMS unit 270 advice 277 which can advise on ML advised-models selection at 470.

In some cases, selecting at 470 includes the MPC unit 266 using advised-models 207 or 204 because the MPC unit gets advice 277 from the MMS unit 272. In some cases, selecting at 470 includes the MPC unit 266 using both: advised 207 and/or 204, and non-advised models (in other words trained ML models 202 and/or 203).

Step 480 is testing the selected ML advised-model 207 using the ML test inputs and ML test outputs 208 to provide runtime test metrics data 205 for the selected types of test metrics 209. Step 480 may include using and/or testing the ML advised-model 207, such as models 204 accessed from unit 262 or models 274 accessed from unit 272. Step 480 may include that the runtime test metrics data 209 are for ML output predictions 297 made by the selected ML advised-model 207 when input with the ML test inputs of 208, as compared to the outputs of 208.

Step 490 is optimizing the selected ML advised-model 207 to become an optimized trained ML advised-model 204 using the runtime test metrics data 205. Step 480 and/or 490 may include, prior to or as part of optimizing, training the selected ML advised-model 207 to become an optimized trained ML advised-model 204, such as using the training data 298. Step 490 may include training model 207 with (e.g., using) training data 298 of the trained models 207, 204, 202 and/or 203.

In some cases, data 205 is compared to metrics data 205 of stored prior ML advised-models 204. Step 490 may include sending the optimized trained ML advised-model 204 to the model store unit 262 for storing as one of the stored ML advised-models 204. Step 490 may include sending the runtime test metrics data 205 to the model store unit 262 for storing as part of the runtime test metrics data 205 at unit 262.

Step 490 may include selecting a new selected ML advised-model 207; updating the current selected ML advised-model 207 using the runtime metrics test data 205; or re-testing and re-optimizing the optimized selected ML advised-model 207 to select a new optimized selected trained ML advised-model 204.

Steps 470-490 may be performed by MPC unit 266.

Steps 470-490 may also create, update and/or delete ML models described at 215-282, 320-330, 350, and/or 380-390.

Step 490 may include using and/or testing ML models 202 and/or 203 in place of models 207. Step 490 may include using and/or testing ML models 122 and/or 132 in place of models 207.

Step 490 may include sending new ML model architectures to the model store unit 262. Step 490 may include sending trained ML models 202 and the trained ML hardware models 203 (and the trained advised models 207) to the model store unit 262.

Step 490 may include an Auto ML subprocess 267 for using and/or testing the ML advised-models 207. In some cases, step 490 includes testing the selected ML advised-model 207 by: training the selected ML advised-model 207 with training data 298 (such as from or of the trained ML models 202 and the trained ML hardware models 203); testing the selected ML advised-model 207 to create the ML advised-model test metrics data 205; comparing the selected ML advised-model test metrics data 205 to the prior runtime test metrics data 205 of unit 262 or validation data of unit 268 corresponding to the stored ML advised-model 207; and when the test metrics data 205 is better than the runtime test metrics data 205 of unit 262, sending the selected ML advised-model 207 to the model store unit 262 for storing as the stored ML advised-model 204, and sending the runtime test metrics data 205 to the model store unit 262 for storing as part of the runtime test metrics data 205 at unit 262. The using, testing, training and comparing may use or be based on advice 277. In some cases, step 400 includes sending the selected ML advised-model 207 to the model store unit 262 for storing as the stored ML advised-model 204, and sending the runtime test metrics data 205 to the model store unit 262 for storing as part of the runtime test metrics data 205 at unit 262, regardless of whether the test metrics data 205 is better than the runtime test metrics data 205 of unit 262.

In some cases, after sending the runtime test metrics data to the model store, step 470 and/or 490 further includes unit 266 querying model MMS unit 272 for advice 277 on creation, training and optimization of one or more of ML advised-models 207.

Step 490 may include validating the stored ML advised-model 204 to become a validated ML hardware model by testing the stored ML advised-model 204 with automated simulator inputs and outputs to produce validation test data; and training the stored ML advised-model 204 with the automated simulator inputs and outputs. Step 490 may include creating a validated version of the stored ML advised-model 204 by writing firmware including the model 202, 203 or 204 of unit 262 (and/or writing an optimized trained ML advised-model) to a selected hardware processor, such as one of processors 201.

Process 400 may also include a feedback loop 401 having arrow 402 sending data to unit 262 which stored the data; arrow 403 sending data from unit 262 to steps 492, 494, 496 and 498 which use or learn from, process, use and/or make predictions using the data; and arrows 404, 405, 406 and 408 sending advice (e.g., advice 277) to steps 420, 430, 450, 460 and 490.

Process 400 also includes flow arrow 402 where information (e.g., all information in some cases) from any or all of steps 410-490 for any or all of the models (advised and/or non-advised) is stored in the Data store unit 262. This information can include the ML model architectures, training parameters, training data, testing results and metrics of any or all of steps 410-490 (e.g., at least from step 490) for any or all of the models.

After arrow 402 storing the information in unit 262, flow arrow 403 shows how or where the information in unit 262 from arrow 402 can be used at steps 492, 494, 496 and 498. Using data from data store module 262, different instantiations of MMS models and processes learn useful things based on past user jobs. The system 100 or a user of the system can decide which MMS models, meta-models, advised models, are useful and design and or implement models (e.g., at MPC unit 266) using them. This also enables steps in process 400 (such as steps 420, 430, 450, 460 and/or 490) to query the MMS unit 272 for advice 277. The more times this feedback loop (e.g., arrow 402 and arrow 403; and any or all of arrows 404, 405, 406 and/or 408) repeats or spins, the more data from MMS unit 272 learning or advice 272 is available and the more accurate the advice 277 is that the MMS unit 272 can give. MMS unit 272 and processes thereof may be a generic concept of learning from data store unit 262 and giving advice 277 at any step 410-490. Below are some examples of concrete implementations of this, such as for training MMS, architecture of MMS, etc.

For example, at step 492 an "architecture MMS" of unit 272 uses the data received from unit 262 by arrow 403 to learn which architectures work best for a given task, user task or user job. Based on or using what it learns at step 492, the "architecture MMS" sends MMS advice (e.g., advice 277) by arrow 404 to the system and/or user at step 420 advising or indicating which ML model architectures to select (if available) during selecting at step 420. Thus, the selected ML model architecture at step 420 may be an advised or a non-advised ML model architecture.

At step 494 a "training MMS" of unit 272 uses the data received from unit 262 by arrow 403 to learn which training parameters give the best results for a given task, user task or user job. Based on or using what it learns at step 494, the "training MMS" sends MMS advice (e.g., advice 277) by arrow 405 to the system and/or user at step 430 advising or indicating which training parameters to use (if available) during training at step 430. Thus, the trained ML model architecture at step 430 may be an advised or a non-advised trained ML model.

At step 496 a "benchmarking MMS" of unit 272 uses the data received from unit 262 by arrow 403 to predict the results of testing a trained ML hardware model on a hardware processor, such as to save time as compared to performing the actual testing on the hardware processor. Based on or using what it learns at step 496, the "benchmarking MMS" sends MMS advice (e.g., advice 277) by arrow 406 to the system and/or user at step 450 and/or 460 advising or indicating the prediction of the results of texting (if available) for programming and/or selecting during step 450 and/or 460. Thus, the trained ML hardware model architecture at step 450 and/or 460 may be an advised or a non-advised trained ML hardware model.

At step 498 an "optimization MMS" of unit 272 uses the data received from unit 262 by arrow 403 to learn which optimization technique (or techniques) give the best results for a given task, user task or user job. Based on or using what it learns at step 498, the "optimization MMS" sends MMS advice (e.g., advice 277) by arrow 407 to the system and/or user at step 490 advising or indicating which optimization technique to use (if available) during optimization at step 490. Thus, the optimized trained ML model architecture at step 490 may be an advised or a non-advised optimized trained ML model.

Although concrete examples are given above for steps 492, 494, 496 and 498, the MMS unit 272 can potentially give advice on any of the steps 410-490 of process 400.

The training data for process 400 may be or include an AutoML subprocess with hyperparameters optimization, a local hyperparameters search or a collection of labeled data samples of training data of the trained ML models 202 and the trained ML hardware models 203. In some cases, the testing of process 400 is using a dataset that is or includes a collection of labeled data samples of training data, validation data and/or test data splits (e.g., expected test outputs and corresponding test inputs) for or of the trained ML models 202 and/or the trained ML hardware models 203.

The training data for process 400 may include a user dataset for training, validating, evaluation and/or testing an ML model such as described at 215-282, 320-330, 350, and/or 380-390.

A core of the solution of system 260 or flow 400 may be a centralized data storage system or records structure for best-performing ones of models 202, 203, 204, 207 and 274. This solution may be referred to as the model store unit 262 which can be a database with each record tracking the performance of a single architecture (which could be a complete model or model backbone). A complete model may be an entire model core plus task specific block, such as prediction heads for object detection with model performance predictions of a trained model. A model backbone may be a model core or engine that can be used for different tasks that is typically pretrained on a different dataset and task than the one requested by the user.

Such a record could include the following types of data for each of models 202, 203 and 204:

A. Architecture description

B. Experimental runtime information on different target chips

C. Expected/simulated runtime information on different chips (profiling proxy)

D. Top accuracy achieved on datasets on which the model was trained

E. Model parameters (weights) associated with top results

F. Expected/simulated performance (e.g. via zero-shot model performance proxy)

G. Record lifecycle information (creation and modification dates, identified, owner etc.).

Types of data A-G may be provided by the MPC unit 266 or the MMS unit 272 hardware testing data of a test run of a trained model 202, 203, 207, 274 or 204 of a certain target chip with actual hardware benchmarks. Types of data A-G may be provided by the MPC unit 266 testing of a test run of a trained model 202, 203, 207, 274 or 204 of a certain target chip. Types of data A-G may be provided by the MMS unit 272 simulated testing of a simulated test run of a trained meta-model for a same model 207, 274 and 204 for a same certain target chip. Types of data A-G may be provided by the MMS unit 272 simulated testing of a simulated test run of a trained meta-model for a different architecture of models 207, 274 and 204 but for a same certain target chip. Types of data A-G may be provided by the MMS unit 272 simulated testing of a simulated test run of a trained meta-model for a same architecture of models 274 and 204 for a certain target chip.

Figure 5:
FIG. 5 is a block data diagram of a quality of information hierarchy chart.

In terms of the quality of information per record of the Model Store unit 262, a hierarchy can be defined and shown in an Information Completeness Ladder. For example, FIG. 5 is a block data diagram of a quality of information hierarchy (e.g., Information Completeness Ladder) chart 500 for Auto ML systems and processes for hardware-aware ML model creation and optimizing. Chart 500 may be for data or a database hosted on one or more computers, such as noted for system 260.

Chart 500 includes an information type column 501 and an information completeness column 502 where "high" is the best information having the most completeness of the information types. For example, trained accuracy has the highest or best information of the ladder, while only model architecture has the lowest (e.g., the listing shows worse at the top to most complete information at the bottom). For information type column 501, model architecture is provided by unit 272 or 266; simulated runtime by unit 272, expected performance by unit 272; tested runtime (e.g., lots of time of test or prediction data) by unit 266 and trained accuracy by unit 266.

In some cases, an operation of system 260 or flow 400 includes an AutoML subprocess of unit 266 that is initialized by a user job or task request 276, which defines the inputs (datasets, task type; or test inputs), user-selected constraints (a chip to target, runtime, and memory limits; or test metric) as well as the objectives: maximizing metric(s) of success (for example, maximizing model accuracy on a provided test dataset), minimizing runtime, minimizing energy per inference. The user job request 276 may be a new user task received by unit 266 which inquiries 275 unit 262 for any models to train that unit 262 has that are sufficient or match request 276 to be advised-models 207 or stored as models 204. The user job request 276 may be a new user task received by unit 266 which inquiries 273 unit 272 for any models (e.g., as part of advice 277) to train that unit 272 has that are sufficient or match request 276 to be advised-models 207 or stored as models 204.

If the Model Store unit 262 or unit 272 contain records (e.g., record structures; models; and/or metrics data; models 202, 203 or 204; and/or data 205 or 206) that match the description of the user or job requests 276, in a complete or partial form, the AutoML subprocess 267 of unit 266 may use those records (e.g., from unit 262 or as advice 277) to achieve the objectives set by the user job request (e.g., job) 276. Unit 266 may continuously monitor the records of unit 262 for matching descriptions of the job requests 276, such as for matching ones of models 202, 203, 207 or 204. The unit 266 may monitor the records periodically, such as every 1, 2, 5 or 10 minutes, hours or days. It may be every week or month. Unit 272 may also continuously monitor the records of unit 262 for matching descriptions of meta-models 274, such as for matching ones of models 202, 203, 207 or 204. The unit 272 may monitor the records periodically, such as every 1, 2, 5 or 10 minutes, hours or days. It may be every week or month.

An order of completeness of information includes, listed as items below from low to high, a use strategy (e.g., see strategy items 1-4 below) for unit 266 or 272 to monitor records of unit 262, e.g., that match the description of the job request 276 for unit 266 or periodically at unit 272. This list of strategy items below is from low to high; but unit 266 or 272 attempts to satisfy high strategy item 4 (Finding historically best-performing models) and works back to strategy item 1 (Sourcing architecture templates) until a strategy item is satisfied by or at unit 266 or 272. The satisfied strategy item is then used to optimize and/or match ones of models 202, 203, 207, 274 or 204. The list of strategy items may be:

1. Sourcing architecture templates or architectures 201 with the highest expected accuracy. This may require a profiling proxy of unit 266, 262 or 272.
2. Sourcing benchmarked or (simulated) architectures with runtime parameters closest to the user target. This may require a runtime or profiling proxy; require a model performance proxy or a real test performance.
3. Warm-starting the state of the AutoML subprocess internal optimization loop. In this case, many non-gradient optimizers may be used (e.g. Bayesian and its derivative such as Tree-Parzen) and may require a number of random trials to be performed to build an internal meta representation of the optimization space (the surrogate model). These are costly (computation, time) but they rarely bring good results. The actual optimization may follow after the initial random trials. To reduce the resources (compute, power/energy, time) needed to reach the optimization phase, system 260 and/or flow 400 may use records from past jobs stored in the Model Store unit 262 to warm-start the optimizer state (e.g., of unit 266 or periodically of 272) instantaneously without the need for a costly random initialization. In some cases, to initialize an algorithm surrogate metamodel (e.g., of unit 266 or periodically of unit 272) a decision variable and optimization objective pairs (a, b) are used, such as:

a. Decision variables:

i. architectural structure of model (architecture type, building blocks configuration etc.)

ii. training hyperparameters iii. Training datasets b. Optimization objectives:

i. Model runnability on target chip ii. Models runtime on target chip iii. Model memory usage on target chip iv. Model accuracy (set of task, such as user task, specific metrics)

v. Model training time

One goal of obtaining the objective of variable a is to select a model most optimized for model 207 or 274 from the models 204. One goal of variable b is to select test metrics that best achieve success of obtaining the objective of variable a.

4. Finding historically best-performing models 204 (on the same or other similar datasets) within constraints and transfer-learning/fine-tuning the models. These models 204 may be trained or untrained models. This can be a best-case scenario or selection for unit 266 or 272 (or a process of that unit), such as to select selected model 207 or simulated model 274.

Unit 266 or 272 (or a process of that unit) may use strategy items 1-4 to monitor records of unit 262, e.g., that match the description of the job request 276 for unit 266 or periodically at unit 272 to optimize and/or match ones of models 202, 203, 207, 274 or 204.

MPC unit 266 may consider or use list of strategy items 1-4 above by, depending on the availability of relevant data in the model store unit 262 and user preferences of request 276, making a decision on which strategy item 1-4 is most likely successful. If not enough data samples are available from unit 262 for strategy item 4, strategy item 3 may be used. If not enough data samples are available from unit 262 for strategy item 3, strategy item 2 may be used. If not enough data samples are available from unit 262 for strategy item 2, strategy item 1 may be used. If not enough information is available even for strategy item 1, AutoML system 260 or process 400 may start "as usual" without any a priori knowledge.

During the job, the AutoML subprocess 267 (or a process of that unit) may store the results in the Model Store unit 262, enriching the information pool of unit 262. This includes updating existing records of unit 262 (e.g. when previously absent runtime information is obtained) or adding a new architecture to unit 262 that has been trained and performs better (in Pareto-optimal sense), compared to existing records of unit 262.

In time, more information is collected in the Model Store unit 262 from unit 266 and the quality of information of individual records increases in unit 262, so that the AutoML jobs 276 which follow will likely be able to adopt a more effective matching strategy (e.g., a higher number) of items 1-4.

In some cases, at system initialization of system 260, unit 266 or process 400, the Model Store unit 262 is empty and the meta-models 274 from MMS unit 272 are not available. Thus, when a user requests an MPC job 276, unit 266 or process 400 cannot successfully query 273 the unit 272 for a matching meta-model or advice 277. At this phase, the MPC unit 266 or process 400 can only produce new models, e.g. via AutoML subprocess, NAS or custom architecture training, such as new ones of models 202, 203, 207 or 204.

Then, as MPC jobs 276 are being executed by unit 266 the Model store unit 262 fills up with data, such as models 202, 203 and 204. The new jobs 276 received may cause the MPC unit 266 to utilize the priori-knowledge stored at unit 262 from the past jobs 276. For example, unit 266 may query and match the best performing model architectures 201, models 202, 203 and/or 204; or pre-trained weights for those models. The more knowledge accumulated in the Model Store unit 262, the better the a priori knowledge of unit 262 can be matched by MPC unit profiles (e.g. user constraints on model size or chip type), thus improving the quality of the output of system 260, process 400 and/or unit 266 over time, when unit 262 records (e.g., record structures; models; and/or metrics data; models 202, 203 or 204; and/or data 205 or 206) match the description of the job request 276.

When the Model store unit 262 contains a sufficiently high amount of model data (e.g., of models 202, 203 or 204; and/or data 205 or 206) the MMS unit 272 can create or optimize meta-models 274, and serve to further improve operations of MPC unit 266 by providing advice 277. For example, instead of profiling models at unit 266 for speed, accuracy or energy on real hardware (intrinsic part of an AutoML job 276), which takes a considerable amount of time and resources, a query 273 to a meta-model 274, such as by a profiling proxy (Software-in-the-loop profiler), can yield a sufficiently accurate estimate or advice 277 of a matching model 274 with dramatically reduced delay and reduced resource usage as compared to query 275.

Figure 6:
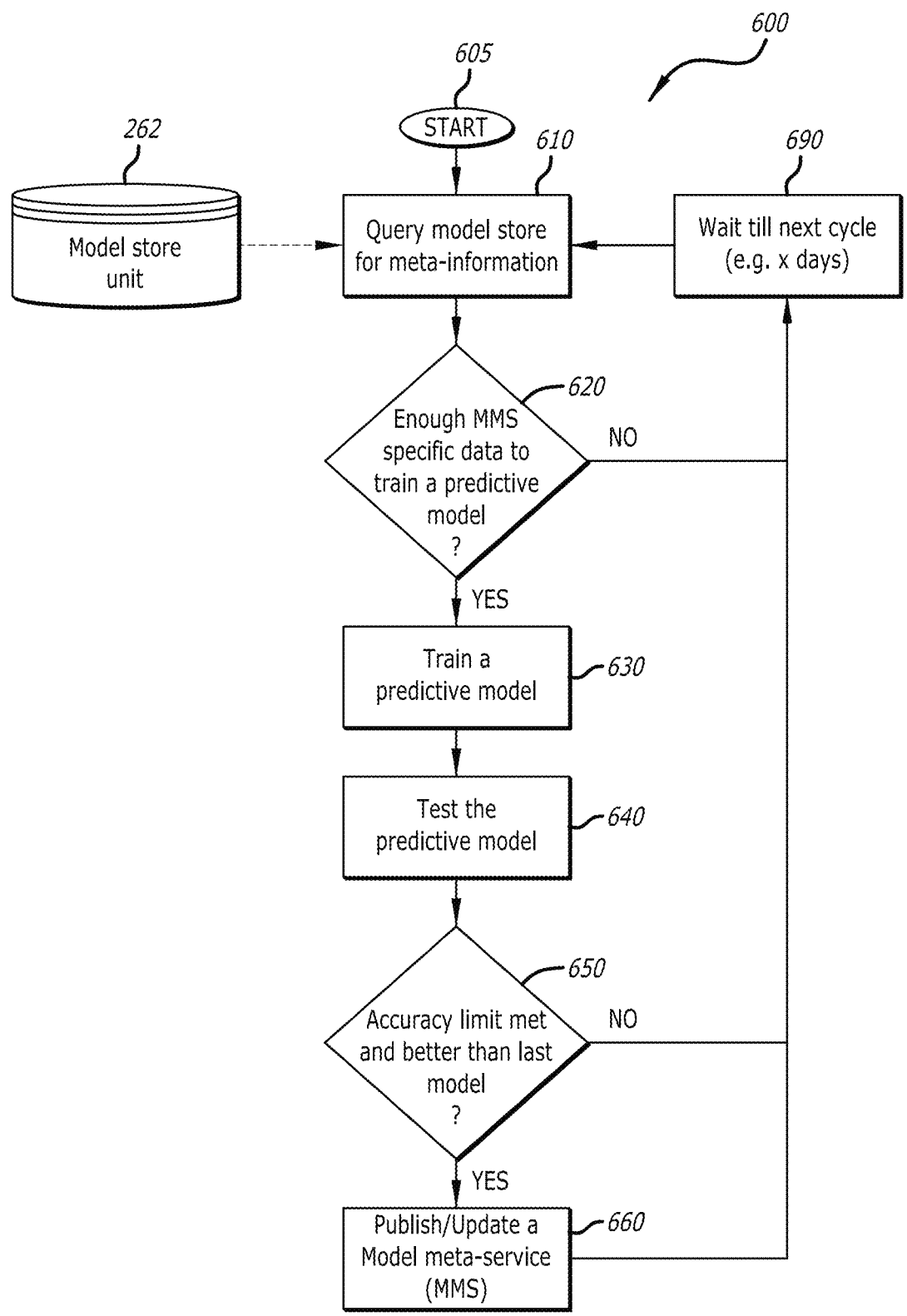
FIG. 6 shows a flow chart of an operating environment or process flow for Auto ML creating and optimizing.
Figure 7A:
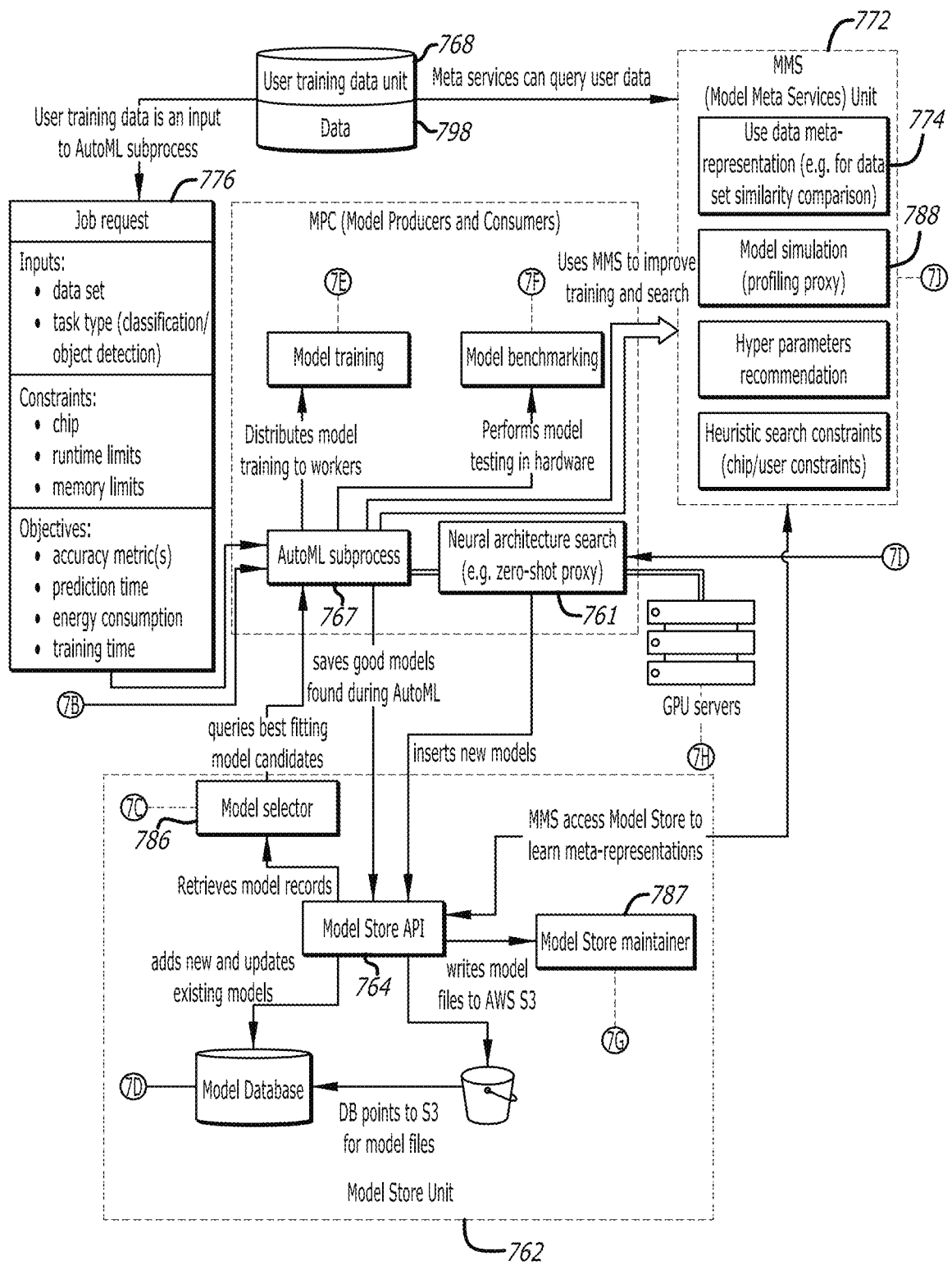
Figures 7B, 7C, 7D:
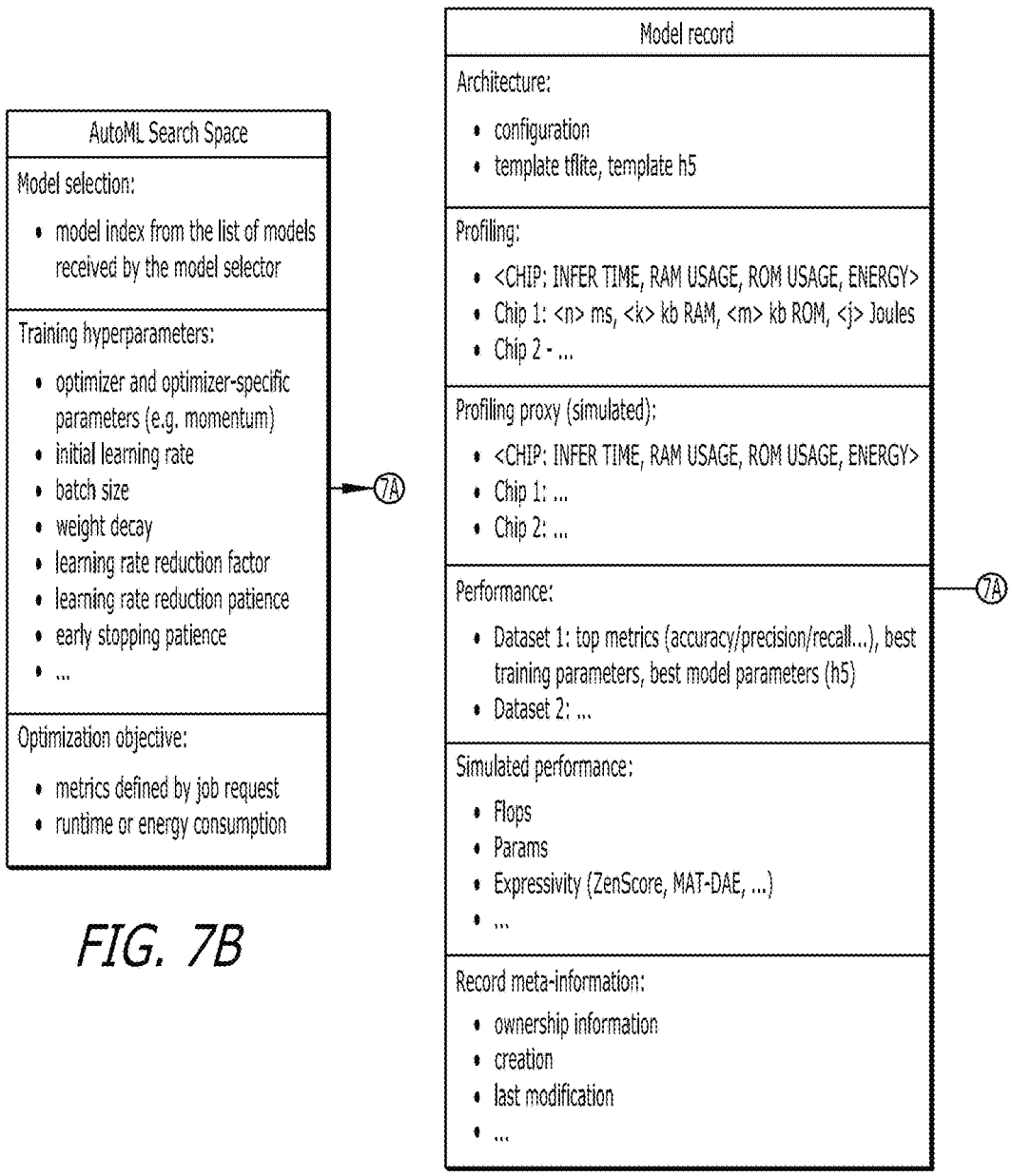
Figure 7I:
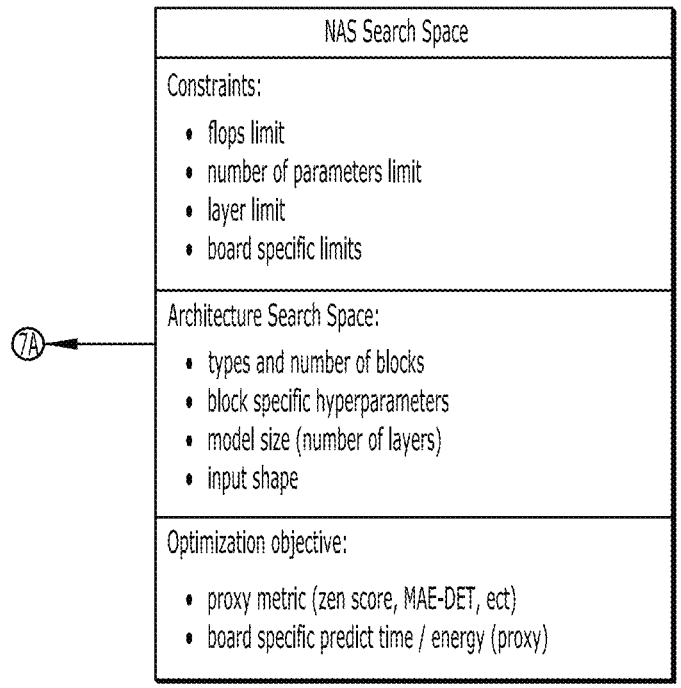
Figure 7J:
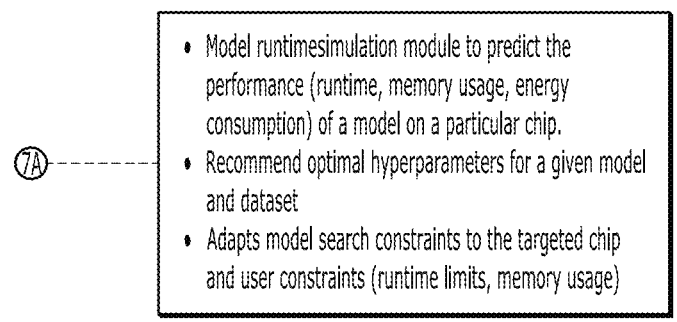

FIG. 6 shows a flow chart of an operating environment or process flow 600 for Auto ML creating and optimizing a ML meta-model 274 that can be used to provide advice 277 used to create an optimized ML model 207 or 204. Flow 600 may be simultaneously and automatically performing Auto ML using simulated (e.g., estimated or predicted) test metrics data 206 and or advice 277 of or from testing and simulating of the ML meta-model 274. Flow 600 may be performed by system 260 and/or unit 272. The flow 600 starts at step 605 and can end at step 690, but the process can also be cyclical by returning to step 610 after step 620, 650 or 660. For example, the process may return to be performed multiple times to create and optimize more than one ML meta-model 274 to become one or more optimized ML meta-models 274.

Flow 600 may present the logic template or flow to create, develop, store and/or update an example meta-model 274. The MMS unit 272 creation process queries the Model Store unit 262 (meta-information) at step 610. At step 620 unit 272 evaluates at step 620 if enough data points are available to create a predictive or meta-model 274. For example, to create a model runtime predictor for a particular chip, a certain number of models tested on that specific chip is required to build a sufficiently accurate predictive model 274. If there are not enough data points, flow 600 continues to 690 to wait until the next cycle which may be a wait of x number of days. The wait may be for 1, 2, 5 or 10 minutes, hours or days. It may be a week or month.

If there are not enough data points, the predictive or meta-model 274 is trained on the data 298 at step 630. The trained model 274 is tested at step 640. At 650 the tested model 274 is compared against (e.g., has its test meta data compared to) a minimum accuracy requirement and test meta data of the or a past model. Step 650 may include comparing the tested ML meta-model test metrics data 206 to the test metrics data 205 or 206 corresponding to stored trained ML models 202, stored trained ML hardware models 203, or stored prior ML meta-models 274.

If the requirements are met (e.g., the tested model metrics data are better, faster, less memory and/or quicker than the stored metrics data) at step 650, the stored meta-model 274 is created or updated (if one exists already) at step 660. That is, tested model 274 and its corresponding advice 277 is stored at unit 272 for responding to queries 273 or matching models 207. If requirements are not met at step 650, flow 600 goes to step 690 to wait. After this point of step 690, MPC unit 266 can query the MMS unit 272 for model 274 and/or advice 277, such as for a job 276. In the example of chip runtime prediction, MPC unit 266 may decide not to test all newly generated models 202, 203 and 207 via hardware or actual chips, but instead can rely on the runtime prediction of the MMS unit 272 model 274 or advice 277.

The MMS unit 272 creation process for models 274 repeats periodically and the unit 266 repeats with each job 276, as the Model Store unit 262 data continuously grows with each unit 272 process 600 or MPC unit 266 run of a job 276. This autonomous meta-model creation and update mechanism of flow 600 allows the system 260 to automatically improve the predictive quality of the meta-model 274, which subsequently improves the performance (resource use, accuracy) of future MPC jobs 279 by unit 266.

In some cases, unit 266 uses models 274 or advice 277 to create, update or optimize models 207. Unit 266 queries unit 262 which matches queries 273 to models 274 to more efficiently and to automatically improve or optimize the predictive quality of the model 207, which subsequently improves the performance (resource use, accuracy) of future MPC jobs 279, such as by optimizing advised-models 207, models 202 or models 203 on a hardware chip (or validated versions of those models).

In some cases, unit 262 contains data from multiple users and/or systems having unit 266 and/or unit 272. That is, one system 260 may share data of its unit 262 and/or unit 272 with other systems 260 having unit 262 and/or unit 272, thus multiplying the data of one or more of the units 262 and/or unit 272. This sharing may allow unit 266 of each system 260 to quickly and efficiently improve their performance (resource use, accuracy) of future MPC jobs 279, such as by optimizing advised-models 207, models 202 or models 203 on a hardware chip (or validated versions of those models) of each system 260.

FIGS. 7A-J form a block diagram of system design 700 for Auto ML systems and processes for hardware-aware ML model creating and optimizing. System 700 includes a Model Store unit 762; a Model, Producer and Consumer (MPC) unit 766; and Model Meta-Services (MMS) unit 772. Each of these units has components, modules or sub-units as noted in FIG. 7. System 700 may be a system for Auto ML creating and optimizing an ML model 202 or 203 to become an optimized ML model 202 or 203 of unit 762, such as using test metrics data 205 of or from testing of the model 202 or 203 by unit 766, or using simulated (e.g., estimated and/or predicted) test metrics data 206 of or from simulated testing of the model 202 or 203 using unit 772. System 700 may be a system for Auto ML creating and optimizing an ML advised-model 207 to become an optimized ML advised-model 204, such as using test metrics data 205 of or from testing of the model advised-model 207 by unit 766, or using simulated test metrics data 206 or advice 277 of or from simulated testing of the model 274 using unit 772.

The Model Store unit 762 contains the model records and the following attributes for each model, such as of models 202, 203 and 204:

Architecture information: configuration, template runnable file (tflite file), template trainable model file (tensorflow format);

Profiling information: chip name, inference time, RAM and ROM usage, energy consumption, . . . ;

Profiling proxy (simulated): same as items as above profiling information;

Performance: dataset name, top metric values (accuracy, precision, recall, mAP, . . . ), best training parameters, best model parameters (h5 file), . . . ;

Simulated performance: number of flops, number of parameters, expressivity (zen score, MAT-DAE, . . . ); and Meta-information: ownership, creation date, last modification date.

The Access API 764 contains the following attributes:

The purpose of this module is to maintain the Model Store unit 762 which includes: adding new models, updating and deleting existing ones from unit 762.

The Model Store maintainer interacts with the database, the S3 storage, and the AutoML subprocess directly. It exposes an API to be able to add new models to the Model Store, update existing ones, or delete models.

It provides security and user access control: for example, weights of models developed on a User's private datasets or a User custom architectures are not shared with other Users.

Adding models: A new model may be found either through NAS 761 (e.g. ZenNAS) or AutoML subprocess 767. This model gets compared to existing similar models in the Model Store unit 762 and inserted into the database only if it meets certain criteria (some examples of such criteria—the model has a higher Zen score, or higher metrics, or lower prediction time than models of similar size . . . )

Updating existing models: A model is updated when new information (profiling: real or proxy or performance information like metrics is available for this model). This data comes from MPC jobs (e.g. AutoML subprocess)

Model Selector 786 contains the following attributes:

The purpose of this module is to find appropriate models from the Model Store unit 762 to be used in an AutoML job 776.

The model selector interacts with the AutoML subprocess module 767 and the database.

The model selector may be implemented as a ML model, or as some combination of algorithmic, heuristic, and ML methods.

The selection criteria for Model Selector 786 to find appropriate models from the Model Store unit 762 to be used in an AutoML job 776 include:

Models that showed good performance on the same dataset or similar dataset or some superset dataset, such as of data 798;

Models that are pre-trained (for transfer learning/fine tuning) on relevant datasets, such as of data 798;

Architectures that will meet the user's constraints (runtime, energy consumption) of a job 776—here the system gives real (hardware-measured) profiling information higher emphasis than simulated (profiling proxy) information;

Performance is measured mainly according to the primary metric of metrics 209 selected for the job 776. If that metric is not available for a model other metrics or expressivity measures (such as zen score) are used.

Select models that fill a certain range of number of flops/number of parameters/model size.

Model Store maintainer 787 contains the following attributes:

It periodically modifies the model records of unit 762 by scraping the Model Store unit 762 to find good models or finding potentially bad models already present in the database and deleting them. A model is deleted from the Model Store unit 762 if it is considered as a bad model according to specific criteria (e.g. shows low performance when used in AutoML jobs 776, is rarely picked by the model selector, other similar models are performing better, . . . ). It can remove duplicated entries (models which are identical).

The MPC unit 766 trains and test the models, such as models 202, 203 and 207;

creates data 205; and has the following attributes:

AutoML Subprocess 767

This module performs the actual training of the models. It does a hyperparameter search over the different model architectures that it received from the Model Selector 786 (which models were chosen is dependent on the information from the job request 776, like the user requirements, board constraints, runtime constraints, ...) and the training hyperparameters, such as of data 798.

An example search space may include:
Model selection: model index from the list of models received by model selector 786;
Training hyperparameters, such as of data 798: optimizer and optimizer-specific parameters (e.g. momentum), initial learning rate, batch size, weight decay, learning rate reduction factor, learning rate reduction patience, early stopping patience etc.;
Optimization objective: metrics defined by job request 776 (accuracy-related metrics or runtime/energy-related objectives).

To speed up training, the AutoML subprocess 767 also uses transfer learning/finetuning, where already existing weights are loaded for a model architecture (complete model or model backbone). Training after loading the weights can be done in a couple of ways, some of which are:
Train all model parameters, but reduce the learning rate;
Freeze backbone layers, and train only head until convergence. After this, unfreeze all layers and train until convergence;
Schedulable transfer learning/finetuning where e.g. layers are progressively or alternatively unfrozen.

Besides accuracy-related model performance, unit 766 also cares about model profiling information on the particular chip selected in the job request 776. This model profiling can be done either on a real chip or can be predicted by a model simulation (e.g., the profiling proxy). The simulation proxy has the advantage of being very quick and hence not creating a bottleneck of running the models on real chips in order to get profiling information. The con is that the information is not 100% accurate.

The NAS 761 sends models to unit 762, such as models 202, 203 and 207; and data 205; and has the following attributes:
The NAS may be or be hosted on servers run in the background and their purpose is to find new model candidates to add to the Model Store unit 792. The throughput of model generation/evaluation is very high (as much as 100k models per day per node);
The objective function may be some zero-shot model performance proxy, e.g. zen score, which is fast to compute and does not require model training to evaluate a model's expressivity.
An example implementation using ZenScore proxy metric is dataset agnostic, but other zero-shot proxies can rank models for a specific dataset.
Interacts with the Model Store to which will filter out the best models and update the store unit 762.
The search space can be defined by:
Constraints: number of flops limit, number of parameters limit, number of layers limit, board/chip specific limits
Architecture search space: types and number of blocks, block-specific hyperparameters, model size, input shape
Optimization objective: zen score, board-specific objectives (profiling proxy, energy consumption).

The Model Metaservices (MMS) unit 772 creates the meta-models, such as models 274; creates data 206 and advice 277; and has the following attributes:
This section provides further details of some example Model Metaservices. A more complete list of Model Metaservices is provided in Architecture section (a-h) of the model meta-services (MMS) unit 272 of system 260 for FIG. 2B. The metaservices may include creating models 274, data 206 and/or advice 277.

The profiling proxy may be a simulation of a hardware profiling test, such as at 640. The profiling proxy may predict performance of a model 274 (runtime, energy, memory usage) without physically testing in hardware. This significantly reduces time required to reject models if not meeting user and chip constraints, such as at 650.

Hyperparameter prediction may be a Model Meta-Service that narrows the hyperparameter search space. It does so by deriving a hyperparameter prediction model 274 from pre-existing results in the Model Store unit 262, such as of models 204. Its goal is to suggest the best training hyperparameters (including learning rate, momentum, batch size, augmentation) for existing and new models and new datasets. The Hyperparameter prediction may be part of data 206 and/or advice 277.

The heuristic search constraints may be an AutoML subprocess search space that can generate models 274 of varying sizes (as many as 4 orders of magnitude of model parameters count). A predictive meta-model 274 trained on historical model benchmarks on a given chip can predict suitable ranges for search space parameters which match user and chip constraints. E.g. limiting the number of model parameters, model computational complexity (flops) and sizes of individual model layers (e.g. number of convolutional filters).

Dataset similarity may include that one key objective of system 260, system 700, process 400 and/or process 600 is to find preexisting model architectures (e.g., models 202, 203, 207, 274 or 204) and their pretrained weights, which best match the user task definition of job 776 and potentially perform best. One of the matching criteria is how well a model (e.g., models 202, 203, 207, 274 or 204) performs on similar datasets, such as of data 798. This may break down to following subcomponents:

selecting existing architectures/models that showed good performance on existing datasets of data 798 to be used on a new dataset;
re-using model weights (transfer learning) between datasets with high similarity;
predicting how well an architecture/model or specific model hyperparameters trained on some dataset will perform on a new dataset.

Establishing a dataset similarity measure can be done via feature embedding. The similarity measure can be used for multiple purposes. There may be two main ways to measure dataset similarity:

I. Content similarity, meaning how similar are data samples from user and queried datasets (e.g. do both datasets contain images with people?). To achieve this, an embedding model (e.g. state of the art vision transformer for image datasets, or a state of the art word embedding model for text) is run on dataset samples to obtain feature embeddings. From that, the dataset embedding can be calculated as:

Mean of sample embeddings, where cosine similarity can be used to evaluate the goodness of match.

A variance preserving, per-sample histogram of embeddings, where histogram similarity (e.g. Kolmogorov-Smirnov test) can be used to evaluate the goodness of match.

II. Label similarity, which may be analogously to content similarity, the labels similarity can be compared using feature embedding.

The final goodness of match, including other criteria, may be expressed as a weighted sum of individual similarity components.

The AutoML system 260 may be a computer product such as a software and/or hardware (e.g., a chip or IC) product, such as for AutoML hardware-aware ML model creation and optimizing. This computer product may be sold to a customer or user, such as for a purpose of allowing the customer to perform AutoML hardware-aware ML model creation and optimizing.

Model 202, 203, 204, 207, 274, 291 and/or 182 may be a computer product such as a software and/or hardware (e.g., a chip or IC) product. This computer product may be sold to a customer or user, such as for the purpose of allowing the customer to provide the AI capabilities of Model 202, 203, 204, 207, 274, 291 and/or 182. The hardware or chip is or includes the version Model 202, 203, 204, 207, 274, 291 and/or 182. The hardware or chip improves computer capability because it has the Model 202, 203, 204, 207, 274, 291 and/or 182 which is not a generic computer product. The hardware or Model 202, 203, 204, 207, 274, 291 and/or 182 is usually a unique computer product in that only that customer may own or have legal rights to it.

Figure 8:
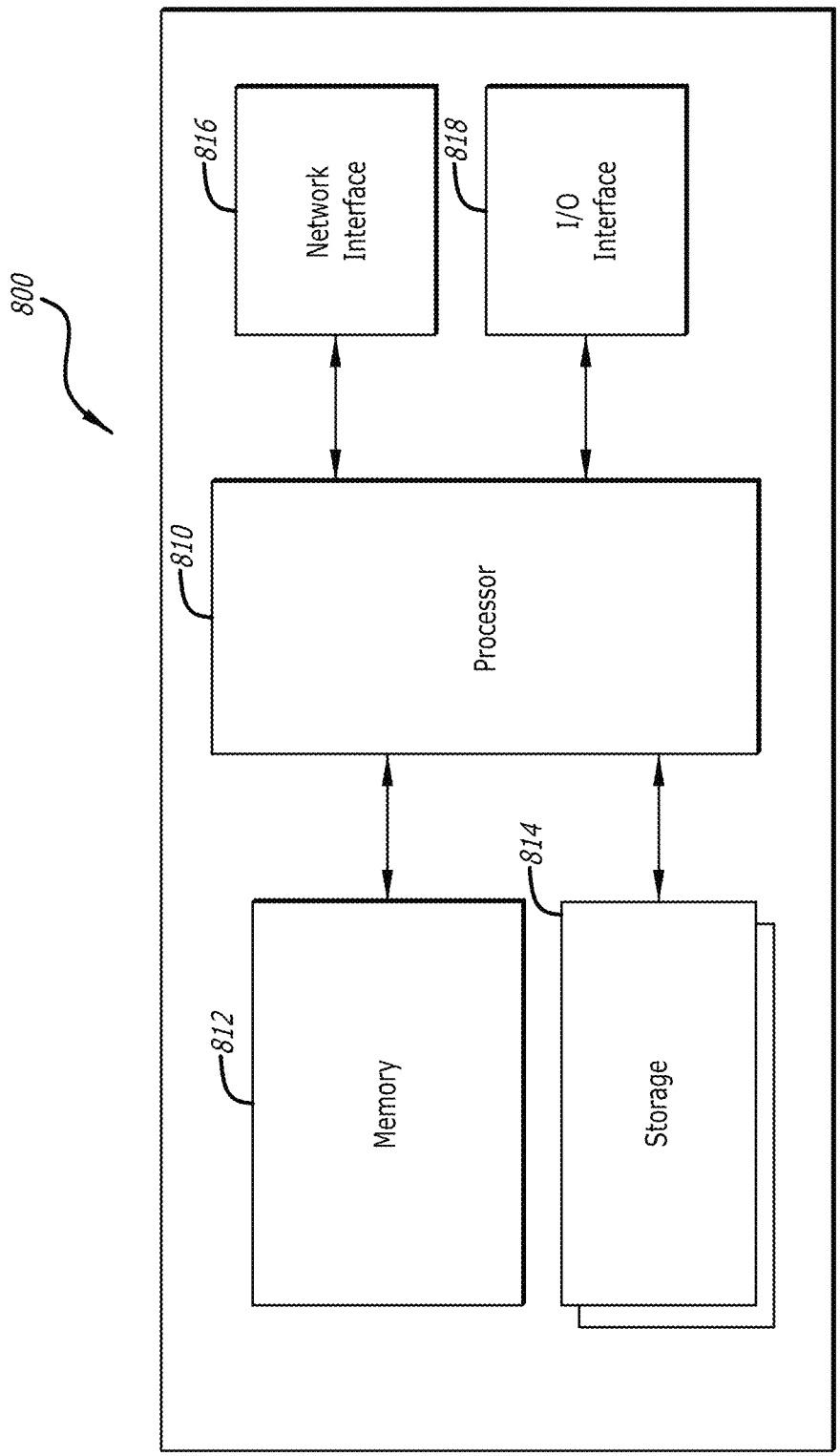
FIG. 8 is a block diagram of a computing device.

FIG. 8 is a block diagram of a computing device 800. The computing device 800 may be representative of any of the units, components or devices of system 100, of system 200, of system 260, used in process 300, used in process 400, used for chart 500, used in system 600, and/or of system 700. The computing device 800 may be a desktop or laptop computer, a server computer, a cloud computer or network, a client computer, a network router, a network switch, a network node, a tablet, a smartphone or other mobile device. The computing device 800 may include software and/or hardware for providing functionality and features of the units described herein, such as for AutoML systems and processes for hardware-aware ML model creation and optimizing, such as to create, update and/or optimize models 202, 203, 207, 274 and/or 204. The computing device 800 may therefore include one or more of: logic arrays, memories, analog circuits, digital circuits, software, firmware and processors. The hardware and firmware components of the computing device 800 may include various specialized units, circuits, software and interfaces for providing the functionality and features of the units described herein.

The computing device 800 has a processor 810 coupled to a memory 812, storage 814, a network interface 816 and an I/O interface 818. The processor 810 may be or include one or more microprocessors, field programmable gate arrays (FPGAs), application specific integrated circuits (ASICs), programmable logic devices (PLDs) and programmable logic arrays (PLAs).

The memory 812 may be or include RAM, ROM, DRAM, SRAM and MRAM, and may include firmware, such as static data or fixed instructions, BIOS, system functions, configuration data, and other routines used during the operation of the computing device 800 and processor 810. The memory 812 also provides a storage area for data and instructions associated with applications and data handled by the processor 810. As used herein the term "memory" corresponds to the memory 812 and explicitly excludes transitory media such as signals or waveforms.

The storage 814 provides non-volatile, bulk or long-term storage of data or instructions in the computing device 800. The storage 814 may take the form of a magnetic or solid state disk, tape, CD, DVD, or other reasonably high capacity addressable or serial storage medium. Multiple storage devices may be provided or available to the computing device 800. Some of these storage devices may be external to the computing device 800, such as network storage or cloud-based storage. As used herein, the terms "storage" and "storage medium" correspond to the storage 814 and explicitly exclude transitory media such as signals or waveforms. In some cases, such as those involving solid state memory devices, the memory 812 and storage 814 may be a single device.

The network interface 816 includes an interface to a network such as a network that can be used to communicate network packets, network messages, telephone calls, faxes, wireless signals and/or wired power signals as described herein. The network interface 816 may be wired and/or wireless.

The I/O interface 818 interfaces the processor 810 to peripherals (not shown) such as displays, video and still cameras, microphones, user input devices (e.g., touchscreens, mice, keyboards and the like) and USB devices. In some cases, the I/O interface 818 includes the peripherals, such as displays, GUIs and user input devices, for being accessed by the user to input data, make selections and view displays as noted.

In some cases, storage 814 is a non-volatile or a non-transitory machine-readable storage medium that includes all types of computer readable media, including magnetic storage media, optical storage media, and solid state storage media. It should be understood that the software can be installed in and sold with any of the units, components or devices of system 100, of system 200, of system 260, used in process 300, used in process 400, used for chart 500, used in system 600, and/or of system 700. Alternatively, the software can be obtained and loaded into the any of the units, components or devices of system 100, of system 200, of system 260, used in process 300, used in process 400, used for chart 500, used in system 600, and/or of system 700, including obtaining the software via a disc medium or from any manner of network or distribution system, including from a server owned by the software creator or from a server not owned but used by the software creator. The software can be stored on a server for distribution over the Internet.

The embodiments of systems, units and processes herein for AutoML systems and processes for hardware-aware ML model creation and optimizing, such as to create, update and/or optimize models 202, 203, 207, 274 and/or 204, may be implemented in or with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

The embodiments herein provide computing machine improvements in the systems and units; and create specific purpose computing devices as the systems and units such as by using any of the units, components or devices of system 100, of system 200, of system 260, used in process 300, used in process 400, used for chart 500, used in system 600, and/or of system 700. The embodiments herein provide computing machine improvements in the systems and units; and create specific purpose computing devices as the systems and units such as any of models 202, 203, 207, 274 and/or 204. The embodiments herein apply to testing, creating, optimization, comparison and pre-test of models 202, 203, 207, 274 and/or 204 as noted herein. These are improvements over training a whole suite of models without running them on actual hardware processors, which has to be super conservative because it is not known which models will really run or not, or how fast they will run on an actual physical processor. This leads to conservative training of models to make sure that when the process is done, the model will work on an actual processor. These are improvements over training a bunch of models locally on a desktop, a laptop, a remote VM, or a cluster and then running them once on a hardware processor to test if the final model works on a customer's device. This training has to be extremely conservative because it has to guess offline what will run and what will not run on actual hardware processors and on which processors.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" or "number" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:
1. A system for automated machine learning (Auto ML) creating and optimizing ML models, the system comprising:
   a model store unit for:
      storing machine learning (ML) model architectures;
      storing trained ML models and trained ML hardware models derived from ML model architectures;
      storing runtime test metrics data corresponding to each of the stored trained ML models and trained ML hardware models;
      storing ML advised-models created based on the runtime test metrics data corresponding to each of the stored trained ML models and trained ML hardware models;
   a model meta-services (MMS) unit for:
      accessing the machine learning (ML) model architectures;
      accessing the trained ML models and trained ML hardware models;
      accessing the runtime test metrics data corresponding to the trained ML models and trained ML hardware models;
      one of creating, updating or replacing ML meta-models based on the runtime test metrics data corresponding to ML model architectures, the stored trained ML models, trained ML hardware models and ML advised-models and runtime test metrics;
      answering to models producer and consumer (MPC) queries by outputting advice on creation, training and optimization of ML advised-models;
   a models producer and consumer (MPC) unit for:
      selecting a selected ML advised-model from the ML advised-models;
      selecting ML test inputs and ML test outputs for testing the selected ML advised-model;
      selecting types of test metrics for testing the selected ML advised-model;
      testing the selected ML advised-model using the ML test inputs and ML test outputs to provide runtime test metrics data for the selected types of test metrics, wherein the runtime test metrics data are for ML output predictions made by the selected ML advised-model input with the ML test inputs, as compared to the ML test outputs;
      training and optimizing the selected ML advised-model to become an optimized trained ML advised-model using the runtime test metrics data;
      sending the optimized trained ML advised-model to the model store unit for storing as one of the stored ML advised-models;
      sending the runtime test metrics data to the model store unit for storing as part of the runtime test metrics data;
      querying model meta-services (MMS) with the MPC query for advice on creation, training and optimization of ML advised-models;
      the MPC unit using the meta-models from the MMS unit to optimize the optimized trained ML advised-model using queries that the store unit matches to the meta-models to more efficiently and automatically improve and/or optimize a predictive quality of the optimized trained ML advised-model and improve the performance of resource use and accuracy of further MPC jobs by optimizing the optimized trained ML advised-model of a trained ML hardware models of a selected hardware processor; and
   a validator for creating a validated version of the stored ML advised-model by writing the optimized trained ML advised-model to a selected hardware processor to be a validated optimized trained ML advised-model.

2. The system of claim 1, the model store unit further comprising a store access layer unit for receiving and providing access to ML model architectures, the trained ML models, the trained ML hardware models, and the stored ML advised-models;

the MPC unit further comprising a neural architecture search (NAS) for:
- sending new ML model architectures to the model store unit; and
- sending trained ML models, trained ML hardware models and trained ML advised-models to the model store unit.

3. The system of claim 1, wherein creating the ML meta-models includes simulating simulated ML meta-model test metrics data of the trained ML models and trained ML hardware models using the runtime test metrics data; and wherein selecting a selected ML advised-model includes using advice received from the MMS regarding at least one of the created ML meta-models.

4. The system of claim 1, wherein creating the ML meta-models includes:
- training ML meta-models with training data of the trained ML models, trained ML hardware models and the trained ML advised-models;
- testing the ML meta-models to create the simulated ML meta-model test metrics data;
- comparing the simulated ML meta-model test metrics data to the runtime test metrics data corresponding to each of the stored trained ML models and stored trained ML hardware models; and
- when the simulated test metrics data performs better than the runtime test metrics data, storing the simulated ML meta-models, and storing the simulated runtime test metrics data as part of advice for responding to queries from the MPC.

5. The system of claim 1,
- wherein selecting a selected ML advised-model includes selecting a selected ML advised-model from the ML advised-models or trained ML models in absence of ML advised-models or in absence of MMS which can advise on ML advised-models selection; and
- after sending the runtime test metrics data to the model store, further comprising querying model meta-services (MMS) for advice on creation, training and optimization of one or more ML advised-models.

6. The system of claim 1, wherein testing the selected ML advised-model includes:
- training the selected ML advised-model with training data;
- testing the selected ML advised-model to create the ML advised-model test metrics data;
- comparing the selected ML advised-model test metrics data to the runtime test metrics data corresponding to the stored ML advised-model; and then
- sending the selected ML advised-model to the model store unit for storing as the stored ML advised-model, and sending the runtime test metrics data to the model store unit for storing as part of the runtime test metrics data at unit.

7. The system of claim 1, further comprising a training data unit storing training data including an AutoML subprocess with hyperparameters optimization, a local hyperparameters search or a collection of labeled data samples of training data of the trained ML models and the trained ML hardware models; and wherein the types of test metrics include multi-objective optimization of power, speed, accuracy, memory usage or numerical exactness of predictions during testing of the trained ML hardware model.

8. The system of claim 1, wherein selecting the selected ML advised-model includes at least one of:
- selecting the selected ML advised-model using advice received by the MPC unit from the MMS; or
- selecting the selected ML advised-model using the simulated metrics test data.

9. The system of claim 1, the MPC unit further for one of:
i) selecting a selected ML model architecture from the ML model architectures of unit; and training a trained ML model by training the selected ML model architecture with ML training inputs and ML training outputs to make ML output predictions based on ML inputs and outputs; or
ii) selecting the trained ML model from a plurality of trained ML models;
iii) selecting a selected hardware processor from a plurality of hardware processors;
iv) programming the selected hardware processor to create a trained ML hardware model by inputting the selected hardware processor with the trained ML model;
v) selecting ML test inputs and ML test outputs for testing the trained ML hardware model;
vi) selecting types of test metrics for testing the trained ML hardware model;
vii) testing the trained ML hardware model using the ML test inputs and ML test outputs to provide runtime test metrics data for the selected types of test metrics, wherein the runtime test metrics data are for ML output predictions made by the trained ML hardware model input with the ML test inputs, as compared to the ML test outputs;
viii) optimizing the trained ML hardware model to become an optimized trained ML hardware model using the runtime test metrics data for the selected types of test metrics, wherein optimizing includes one of:
- selecting a new selected ML model architecture,
- selecting a new selected hardware processor, or
- updating the trained ML model using the runtime metrics test data; and
ix) sending the trained ML hardware model to the model store unit for storing as the stored trained ML hardware model, and sending the runtime test metrics data to the model store unit for storing as part of the runtime test metrics data at unit.

10. A method for automated machine learning (Auto ML) creating and optimizing ML models, the method comprising:
- storing trained ML models and trained ML hardware models derived from ML model architectures;
- storing runtime test metrics data corresponding to each of the stored trained ML models and trained ML hardware models;
- storing ML advised-models created based on the runtime test metrics data corresponding to each of the stored trained ML models and trained ML hardware models;
- creating ML meta-models based on the runtime test metrics data corresponding to each of the stored trained ML models and trained ML hardware models;
- testing trained ML meta-models to create simulated ML meta-model test metrics data;
- comparing the simulated ML meta-model test metrics data to the runtime test metrics data corresponding to each of the stored trained ML models and stored trained ML hardware models;
- selecting a selected ML advised-model from the ML advised-models;
- selecting ML test inputs and ML test outputs for testing the selected ML advised-model;
- selecting types of test metrics for testing the selected ML advised-model;

testing the selected ML advised-model using the ML test inputs and ML test outputs to provide runtime test metrics data for the selected types of test metrics, wherein the runtime test metrics data are for ML output predictions made by the selected ML advised-model input with the ML test inputs of, as compared to the ML test outputs of;

optimizing the selected ML advised-model to become an optimized trained ML advised-model using the runtime test metrics data;

sending the optimized trained ML advised-model for storing as one of the stored ML advised-models;

sending the runtime test metrics data for storing as part of the runtime test metrics data;

using the ML meta-models to optimize the optimized trained ML advised-model using queries that matches to the ML meta-models to more efficiently and automatically improve and/or optimize a predictive quality of the optimized trained ML advised-model and improve the performance of resource use and accuracy of further models producer and consumer (MPC) jobs by optimizing the optimized trained ML advised-model of a trained ML hardware models of a selected hardware processor; and creating a validated version of the stored ML advised-model by writing the optimized trained ML advised-model to a selected hardware processor to include a validated optimized trained ML advised-model.

11. The method of claim 10, further comprising:
receiving and providing access to ML model architectures, the trained ML models, the trained ML hardware models, and the stored ML advised-models;
sending new ML model architectures for storing as one of the stored ML advised-models; and
sending trained ML models and the trained ML hardware models for storing as one of the stored ML advised-models.

12. The method of claim 10, further comprising:
accessing the trained ML models and trained ML hardware models;
accessing the runtime test metrics data corresponding to the trained ML models and trained ML hardware models; and
wherein creating the ML meta-models includes simulating simulated ML meta-model test metrics data of the trained ML models and trained ML hardware models using the runtime test metrics data; and wherein selecting a selected ML advised-model includes using advice received regarding at least one of the created ML meta-models.

13. The method of claim 10, wherein creating the ML meta-models includes:
training ML meta-models with training data of the trained ML models and the trained ML hardware models; and
when the simulated test metrics data performs better than the runtime test metrics data, storing the simulated ML meta-models, and storing the simulated runtime test metrics data as advice for selecting the selected advised ML model.

14. The method of claim 10,
wherein selecting a selected ML advised-model includes selecting a selected ML advised-model from the ML advised-models or trained ML models in absence of ML advised-models or in absence of model meta-services (MMS) which can advise on ML advised-models selection; and after sending the runtime test metrics data to the model store, further comprising querying model meta-services (MMS) for advice on creation, training and optimization of one or more ML advised-models.

15. The method of claim 10, wherein testing the selected ML advised-model includes:
training the selected ML advised-model with training data;
testing the selected ML advised-model to create the ML advised-model test metrics data;
comparing the selected ML advised-model test metrics data to the runtime test metrics data corresponding to the stored ML advised-model; and then
sending the selected ML advised-model for storing as the stored ML advised-model, and sending the runtime test metrics data for storing as part of the runtime test metrics data at unit.

16. The method of claim 10, wherein the training data includes an AutoML subprocess with hyperparameters optimization, a local hyperparameters search or a collection of labeled data samples of training data of the trained ML models and the trained ML hardware models; and wherein the types of test metrics include multi-objective optimization of power, speed, accuracy, memory usage or numerical exactness of predictions during testing of the trained ML hardware model.

17. The method of claim 10, wherein selecting the selected ML advised-model includes at least one of:
selecting the selected ML advised-model using advice received in response to a query; or
selecting the selected ML advised-model using the simulated metrics test data.

18. A non-transitory machine readable medium storing a program having instructions which when executed by a processor will cause the processor to perform automated machine learning (Auto ML) creating and optimizing ML meta-models, the instructions of the program for:
storing trained ML models and trained ML hardware models derived from ML model architectures;
storing runtime test metrics data corresponding to each of the stored trained ML models and trained ML hardware models;
storing ML advised-models created based on the runtime test metrics data corresponding to each of the stored trained ML models and trained ML hardware models;
creating ML meta-models based on the runtime test metrics data corresponding to each of the stored trained ML models and trained ML hardware models;
testing trained ML meta-models to create simulated ML meta-model test metrics data;
comparing the simulated ML meta-model test metrics data to the runtime test metrics data corresponding to each of the stored trained ML models and stored trained ML hardware models;
selecting a selected ML advised-model from the ML advised-models;
selecting ML test inputs and ML test outputs for testing the selected ML advised-model;
selecting types of test metrics for testing the selected ML advised-model;
testing the selected ML advised-model using the ML test inputs and ML test outputs to provide runtime test metrics data for the selected types of test metrics, wherein the runtime test metrics data are for ML output predictions made by the selected ML advised-model input with the ML test inputs of, as compared to the ML test outputs of;

optimizing the selected ML advised-model to become an optimized trained ML advised-model using the runtime test metrics data;

sending the optimized trained ML advised-model for storing as one of the stored ML advised-models; and sending the runtime test metrics data for storing as part of the runtime test metrics data;

using the ML meta-models to optimize the optimized trained ML advised-model using queries that matches to the ML meta-models to more efficiently and automatically improve and/or optimize a predictive quality of the optimized trained ML advised-model and improve the performance of resource use and accuracy of further models producer and consume (MPC) jobs by optimizing the optimized trained ML advised-model of a trained ML hardware models of a selected hardware processor; and creating a validated version of the stored ML advised-model by writing the optimized trained ML advised-model to a selected hardware processor to include a validated optimized trained ML advised-model.

19. The medium of claim 18, and further comprising:
a user input device;
a display device;
the processor; and
a memory coupled to the processor;
wherein the processor and the memory comprise circuits and software for performing the instructions on the storage medium.

20. The instructions of claim 18, which when executed by a processor will cause the processor to further perform one of:

accessing the trained ML models and trained ML hardware models;

accessing the runtime test metrics data corresponding to the trained ML models and trained ML hardware models; and wherein creating the ML meta-models includes simulating simulated ML meta-model test metrics data of the trained ML models and trained ML hardware models using the runtime test metrics data; and wherein selecting a selected ML advised-model includes using advice received regarding at least one of the created ML meta-models.

* * * * *